Figure 1:
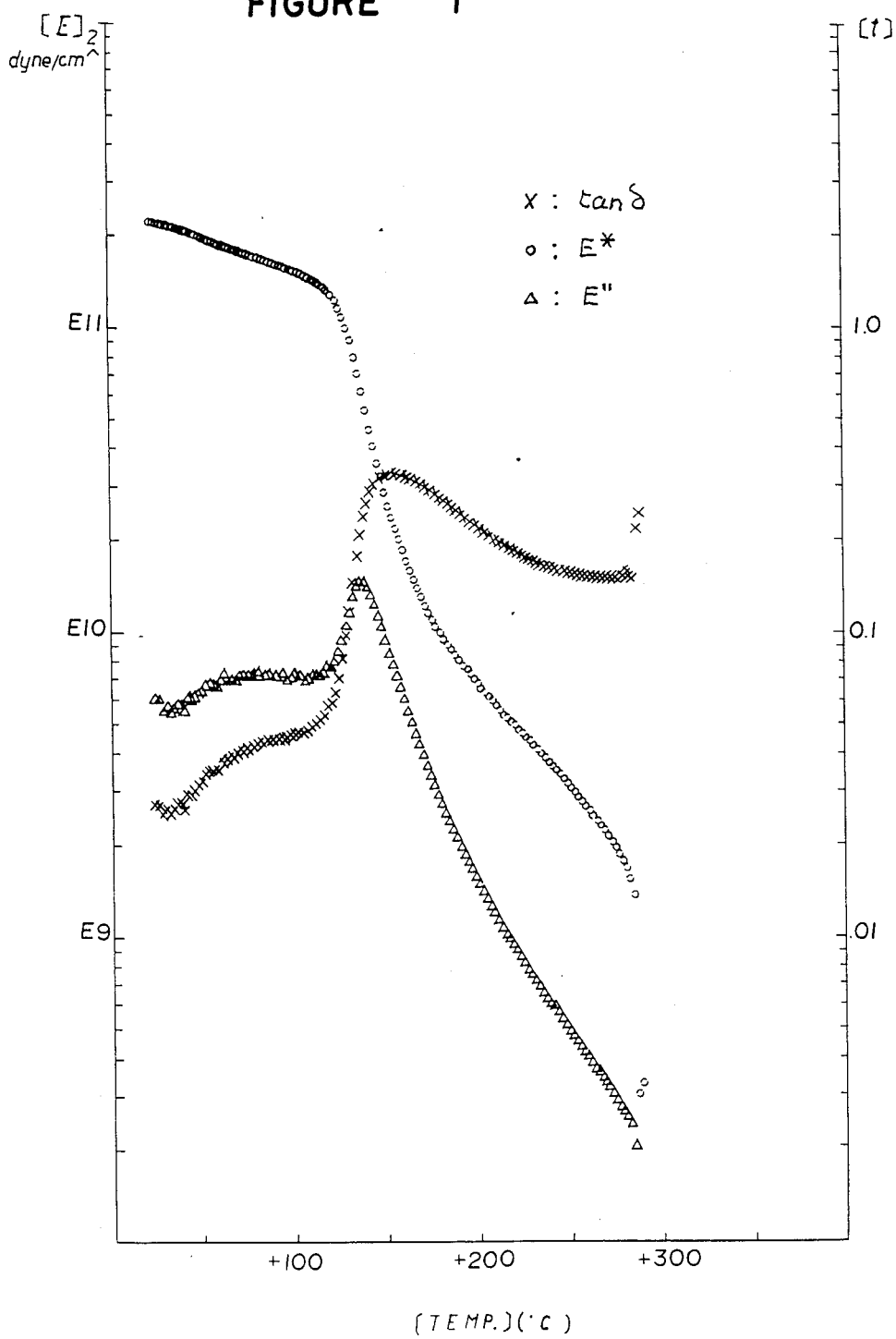

United States Patent [19]

Kishiro et al.

[11] Patent Number: 4,857,626
[45] Date of Patent: Aug. 15, 1989

[54] WHOLLY AROMATIC POLYESTER AND PROCESS FOR ITS PRODUCTION

[75] Inventors: Osamu Kishiro, Atsugi; Atsushi Kasai, Machida; Seiichi Nozawa, Yamato; Hiroshi Kamata, Yokohama, all of Japan

[73] Assignee: Mitsubishi Chemical Industries Limited, Tokyo, Japan

[21] Appl. No.: 136,758

[22] Filed: Dec. 22, 1987

[30] Foreign Application Priority Data

Dec. 23, 1986 [JP] Japan .................. 61-305299

[51] Int. Cl.$^4$ ............................................ C08G 63/02
[52] U.S. Cl. ................... 528/176; 528/190; 528/191; 528/193; 528/194; 528/272; 528/300; 528/304; 528/305; 528/308; 252/299.6; 252/299.65
[58] Field of Search ............... 528/176, 190, 191, 193, 528/194, 272, 300, 304, 305, 308; 252/299.6, 299.65

[56] References Cited

U.S. PATENT DOCUMENTS 4,447,593  5/1984  Funakoshi et al. .................. 528/176

Primary Examiner—John Kight
Assistant Examiner—S. A. Acquah
Attorney, Agent, or Firm—Oblon, Spivak, McClelland, Maier & Neustadt

[57] ABSTRACT

A wholly aromatic polyester consisting essentially of:
(a) from 2 to 50 equivalent % of a 3,3'-biphenyldicarboxylic acid residue;
(b) from 10 to 40 equivalent % of a dicarboxylic acid residue excluding the residue of 3,3'-bisphenyldicarboxylic acid;
(c) from 10 to 52 equivalent % of a dioxy compound residue of the formula:

$$+O-R^2-O+$$

wherein $R^2$ is a group of the formula

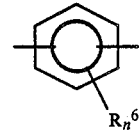

wherein $R^6$ is a $C_1$–$C_4$ alkyl group or a phenyl group and n is 0 or an integer up to 4,

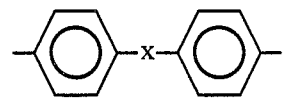

wherein X is as defined above,

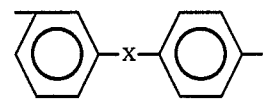

wherein X is as defined above, and/or

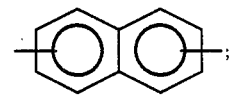

and
(d) from 0 to 80 equivalent % of an oxycarboxylic acid residue of the formula:

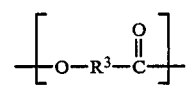

wherein $R^3$ is a bivalent aromatic hydrocarbon group or $R^4$—X—$R^5$, wherein $R^4$, $R^5$ and X are as defined above, said polyester having a melt viscosity of at least 50 poise as measured at 275° C. at 100 sec$^{-1}$.

19 Claims, 17 Drawing Sheets

WHOLLY AROMATIC POLYESTER AND PROCESS FOR ITS PRODUCTION

The present invention relates to a wholly aromatic polyester. More particularly, the present invention relates to a wholly aromatic polyester having 3,3'-biphenyldicarboxylic acid residues, which has excellent heat resistance and moldability, and a process for its production. The wholly aromatic polyester of the present invention is useful for molded products, films, fibers, etc.

The following five instances are known as polyesters having 3,3'-biphenyldicarboxylic acid residues:

(1) A polyester with 2,2,3,3,4,4-hexafluoro-1,5-pentanediol, as disclosed in Chem. Ind. (London) (28) 934–9 (1969).

(2) An aromatic aliphatic polyester composed of an aliphatic or alicyclic residues, as disclosed in Izvest. Akad. Nauk., S.S.S.R, Otdel. Khim. Nauk, 737–745 (1957).

(3) A polyester with m-xylidene glycol, ibid, 338–343 (1959).

(4) A wholly aromatic polyester of 4-hydroxy-3-methylbenzoic acid with 2-(1-methylpentyl)-1,4-benzenediol, as disclosed in U.S. Pat. No. 4,447,593.

(5) A wholly aromatic polyester with 2-(1-methylpentyl)-1,4-benzenediol, as disclosed in U.S. Pat. No. 4,447,593.

From their structures, the polyesters of (1), (2), (3) and (5) exhibit no liquid crystal properties in their molten phases. Likewise, the polyester of (4) hardly exhibits liquid crystal properties in its molten phase and has a high intrinsic viscosity, and the flow initiating temperature is as high as 295° C., whereby the moldability is poor, and there will be a difficulty in its production process. Further, the polyesters of (1) and (2) are poor in the heat resistance from their structures. The polyester of (3) is disclosed to have a softening point of from 99 to 107° C. The glass transition temperature (Tg) is lower, thus indicating the poor heat resistance. The polyesters of (4) and (5) have flow initiating temperatures as high as 295° C. and 330° C., respectively, and thus they are believed to be poor in the processability.

Further, wholly aromatic polyesters composed of 4,4'-biphenyldicarboxylic acid residues, i.e. polyesters wherein the starting monomer residues are all aromatic components, are also known (e.g. Japanese Unexamined Patent Publication No. 41328/1984). These polyesters have excellent heat resistance, but they require extremely high temperatures for molding and their melt viscosities are high, whereby they have difficulties in the moldability.

Further, for the production of such wholly aromatic polyesters by a melt phase method, there has been a difficulty that the polymers tend to be solidified and can not be withdrawn by a conventional reactor such as a vertical agitation type for the production of polyethylene terephthalate.

On the other hand, conventional liquid crystal polymers have substantial anisotropy in the modulus of elasticity in the flow direction (MD) and the transverse direction (TD), (hereinafter referred to simply as $E_{MD}$ and $E_{TD}$, respectively) although the modulus of elasticity is high, and thus they have a serious problem when used as molded products.

It is an object of the present invention to provide a wholly aromatic polyester which exhibits optical anisotropy in the molten phase (i.e. a liquid crystal phase) and thus has excellent moldability (fluidity) and which has a high elastic modulus and excellent heat resistance, and to provide a polymer which is capable of being produced by a conventional apparatus.

Another object of the present invention is to provide a wholly aromatic polyester which has a high elastic modulus as a liquid crystal polymer and with its anisotropy moderated i.e. with the $E_{MD}/E_{TD}$ ratio being small.

A further object of the present invention is to provide a polymer having well balanced heat resistance and moldability with the melt viscosity being low as compared with a conventional aromatic polyester obtained by a combination of terephthalic acid and isophthalic acid and which is capable of being produced by a conventional apparatus.

The present invention provides a wholly aromatic polyester comprising:

(a) from 2 to 50 equivalent % of a 3,3'-biphenyldicarboxylic acid residue of the formula:

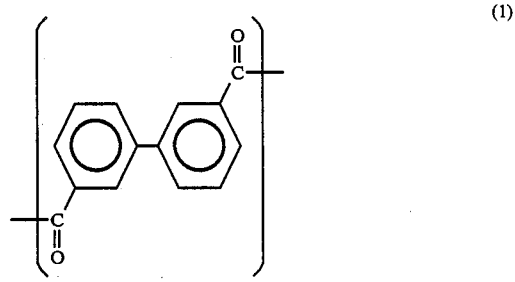

(b) from 0 to 50 equivalent % of a dicarboxylic acid residue of the formula:

wherein $R^1$ is a bivalent aromatic hydrocarbon group or a group of the formula $R^4$—X—$R^5$ wherein each of $R^4$ and $R^5$ is a bivalent aromatic hydrocarbon group and X is an oxygen atom, a sulfur atom, a sulfonyl group, a carbonyl group, an alkylene group, an ester group or a direct bond, provided that $R^1$ is not a 3,3'-biphenyl group, (c) from 10 to 52 equivalent % of a dioxy compound residue of the formula:

wherein $R^2$ is a group of the formula

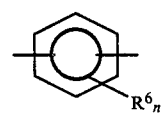

wherein $R^6$ is a $C_1$-$C_4$ alkyl group or a phenyl group and n is an integer of from 0 to 4,

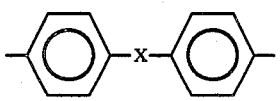

wherein X is as defined above,

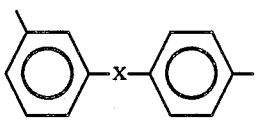

wherein X is as defined above, and/or

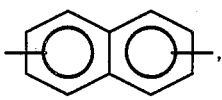

and (d) from 0 to 80 equivalent % of an oxycarboxylic acid residue of the formula:

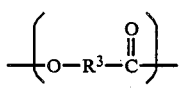
(4)

wherein $R^3$ is a bivalent aromatic hydrocarbon group or $R^4$—X—$R^5$ wherein $R^4$, $R^5$ and X are as defined above, and having a melt viscosity of at least 50 poise as measured at 275° C. at 100 sec$^{-1}$.

Now, the present invention will be described in detail with reference to the preferred embodiments.

Figure 2:
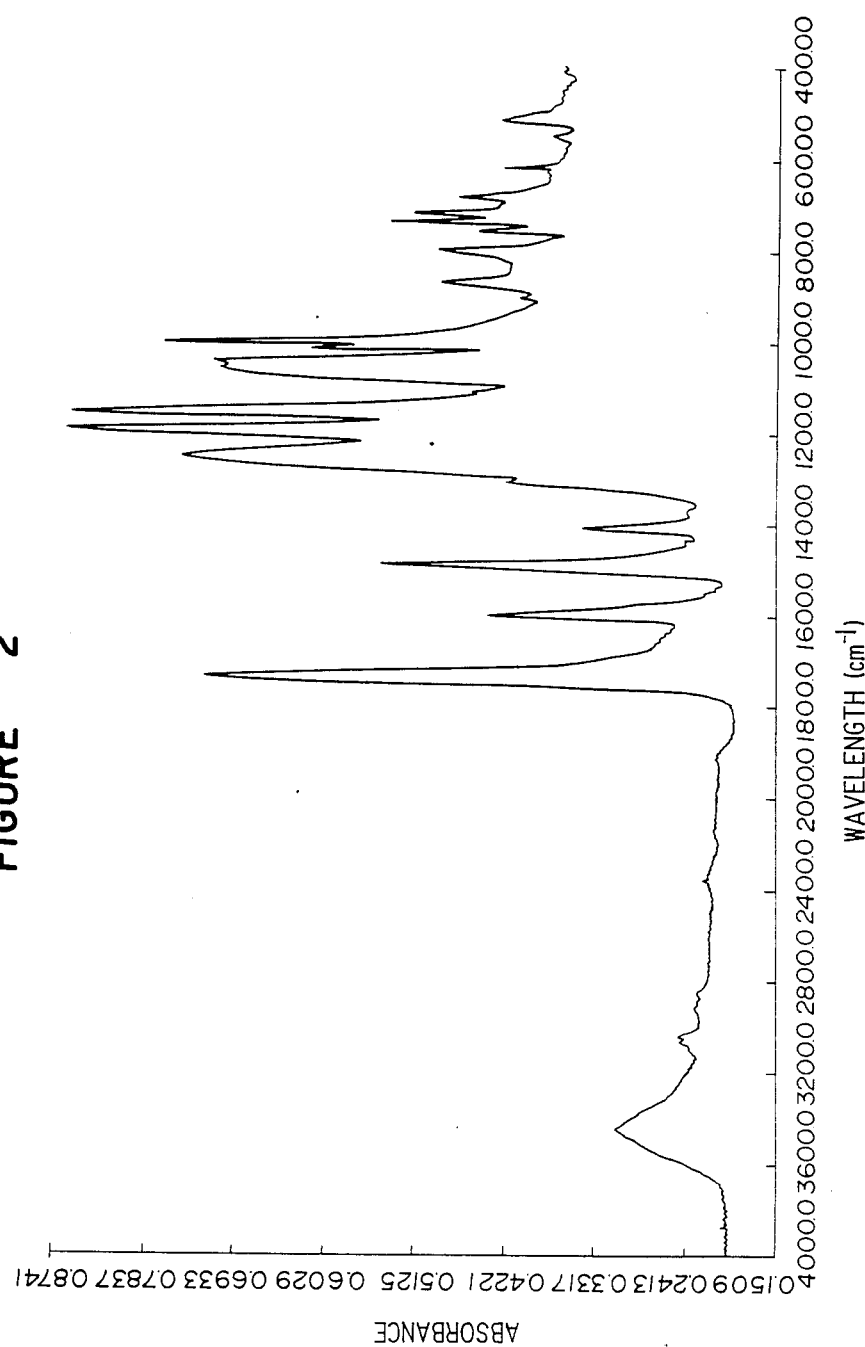
Figure 3:
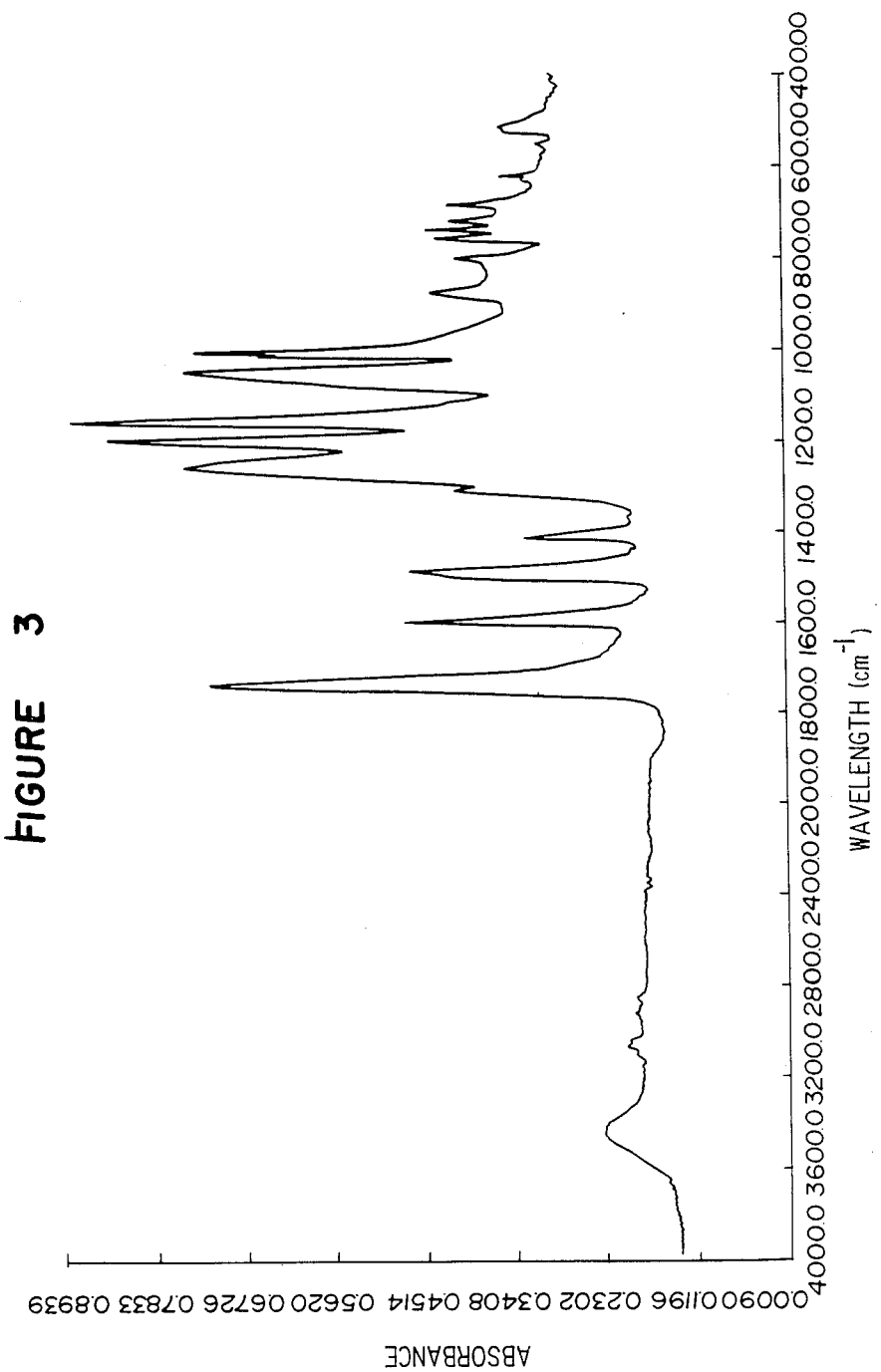
Figure 4:
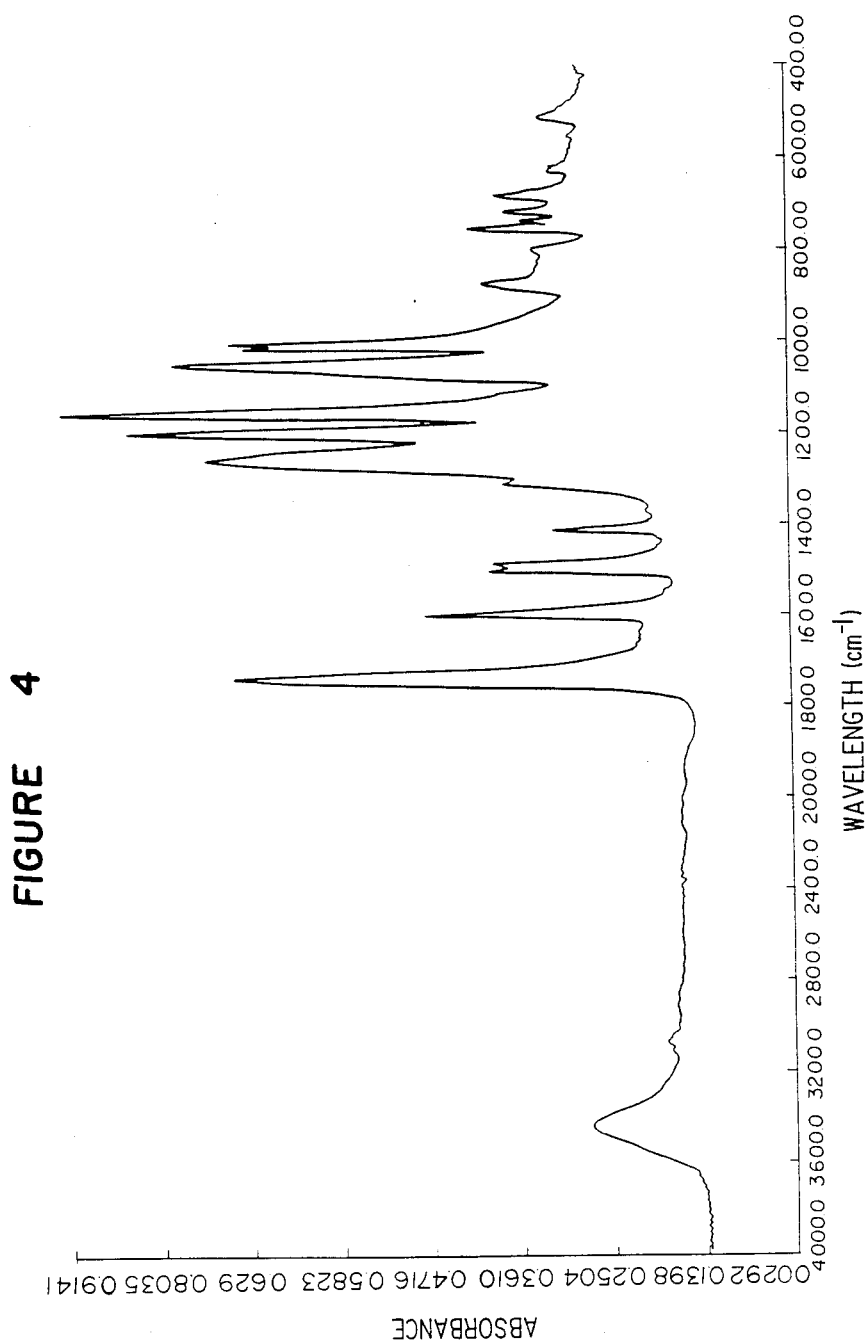
Figure 5:
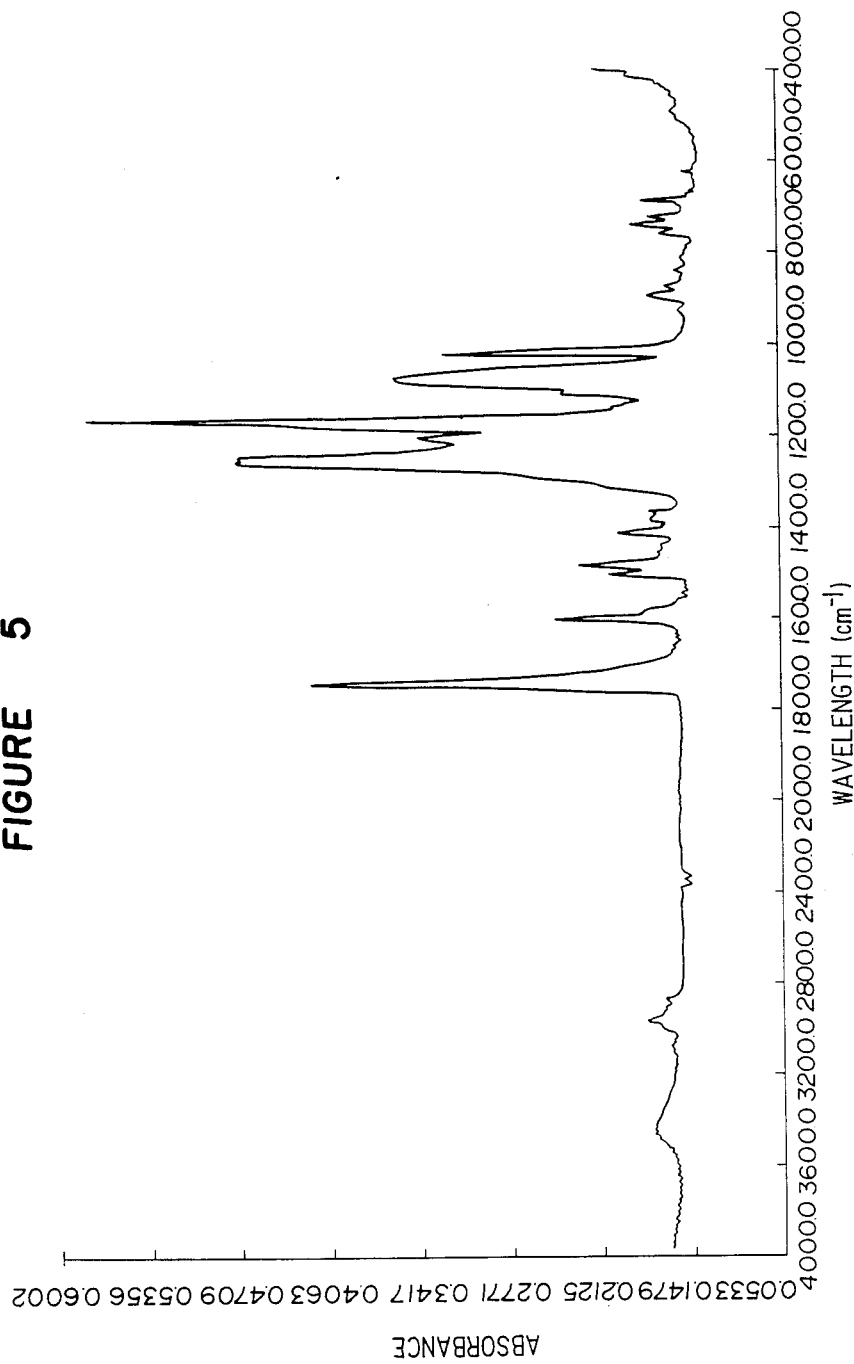
Figure 6:
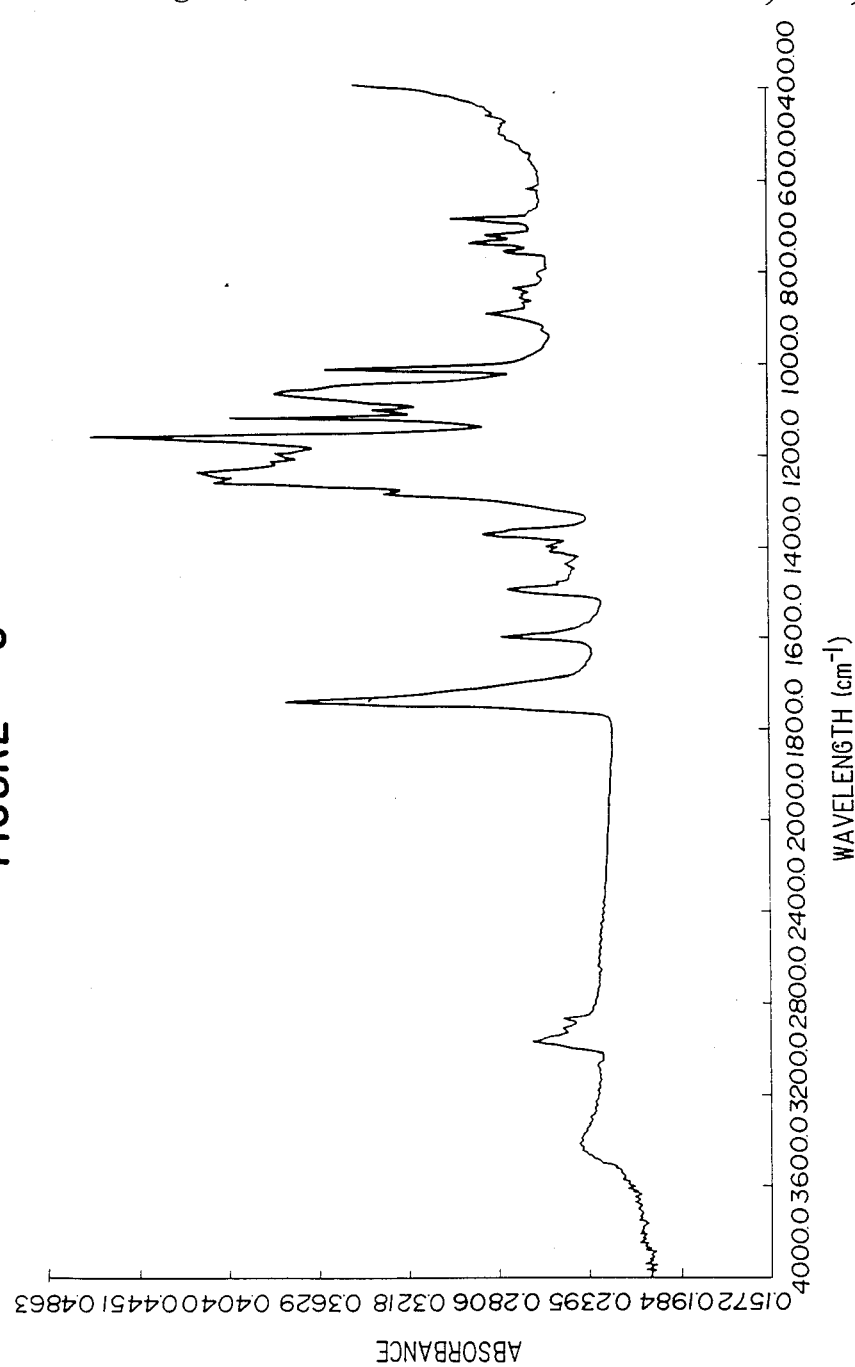
Figure 7:
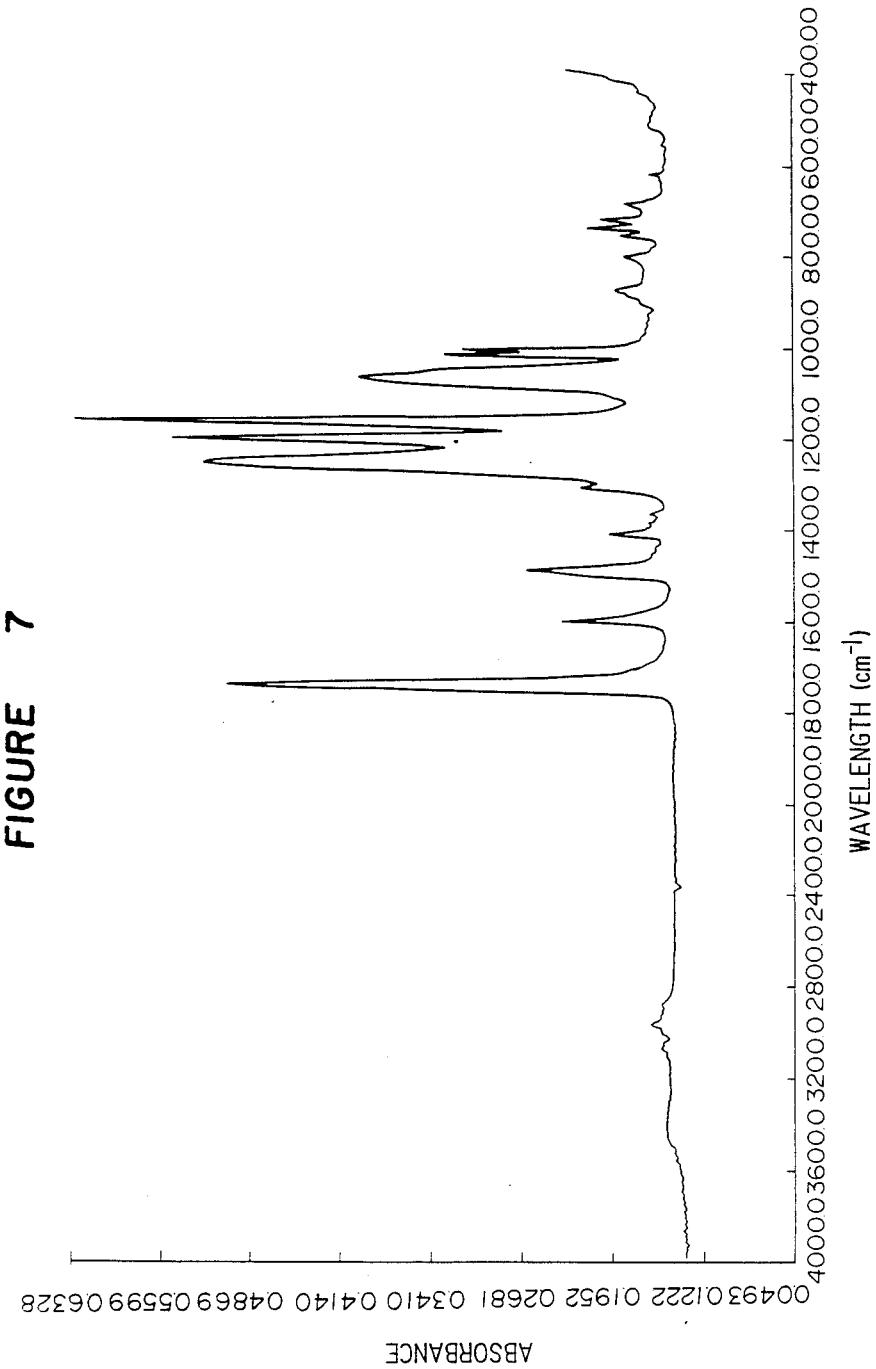
Figure 8:
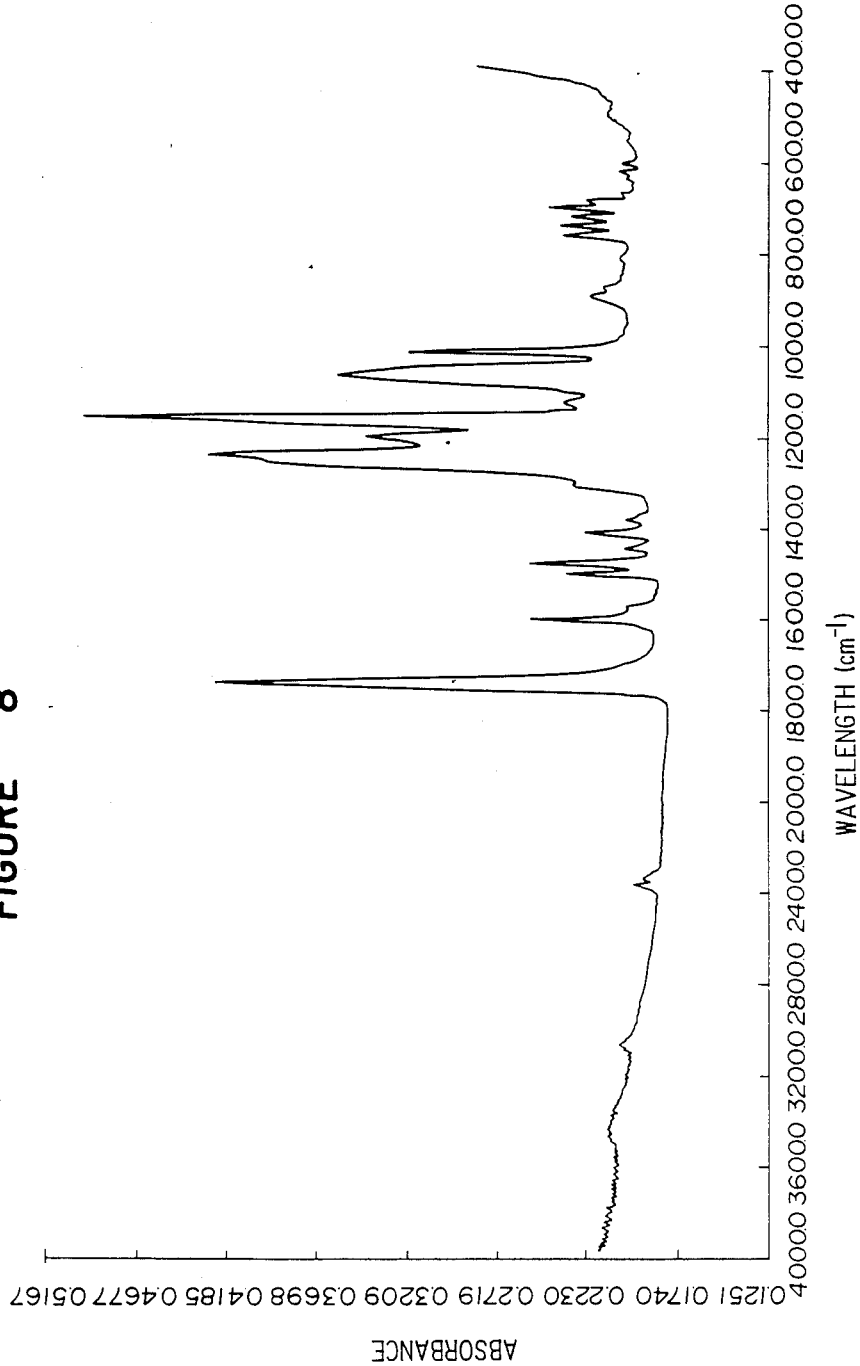
Figure 9:
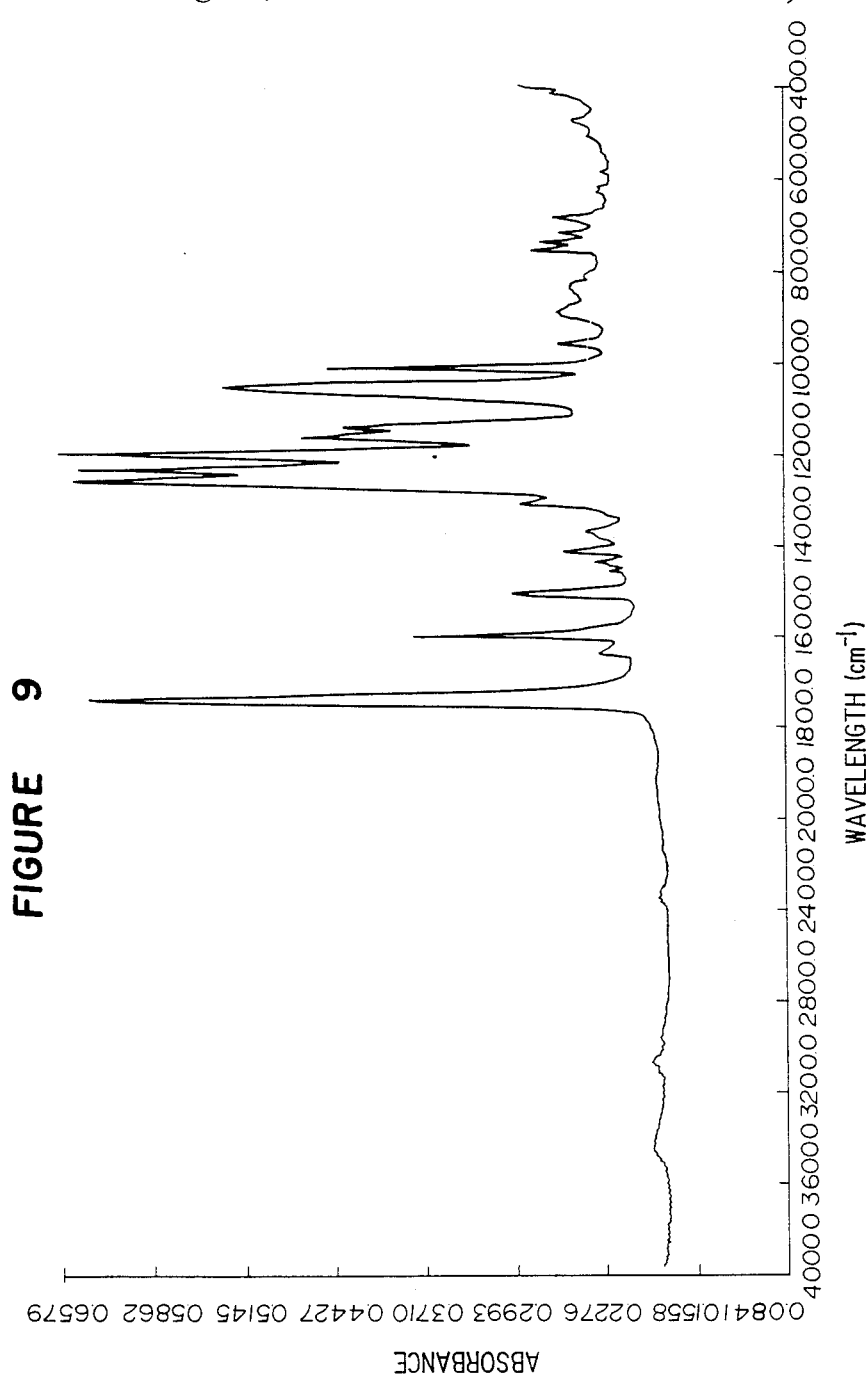
Figure 10:
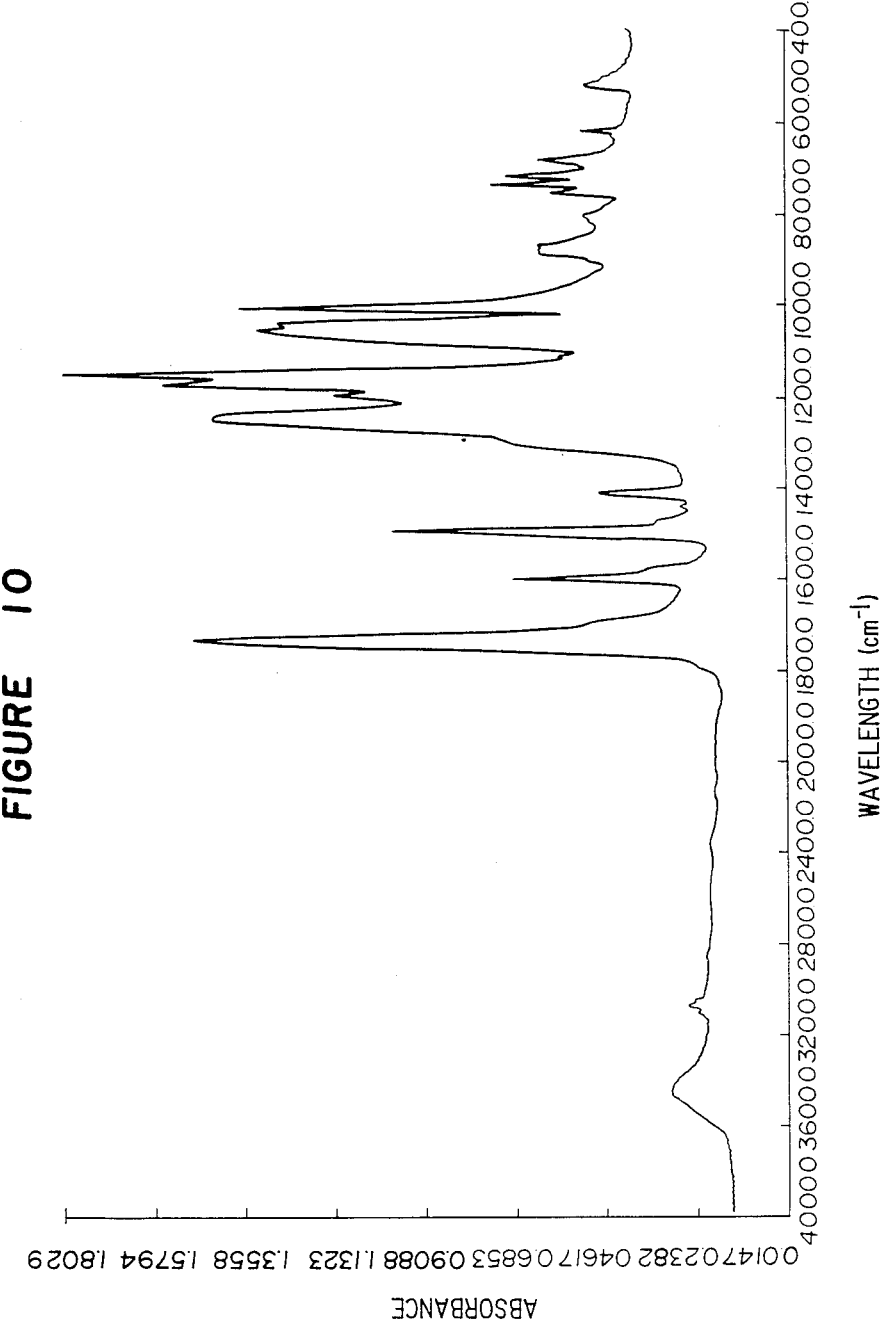
Figure 11:
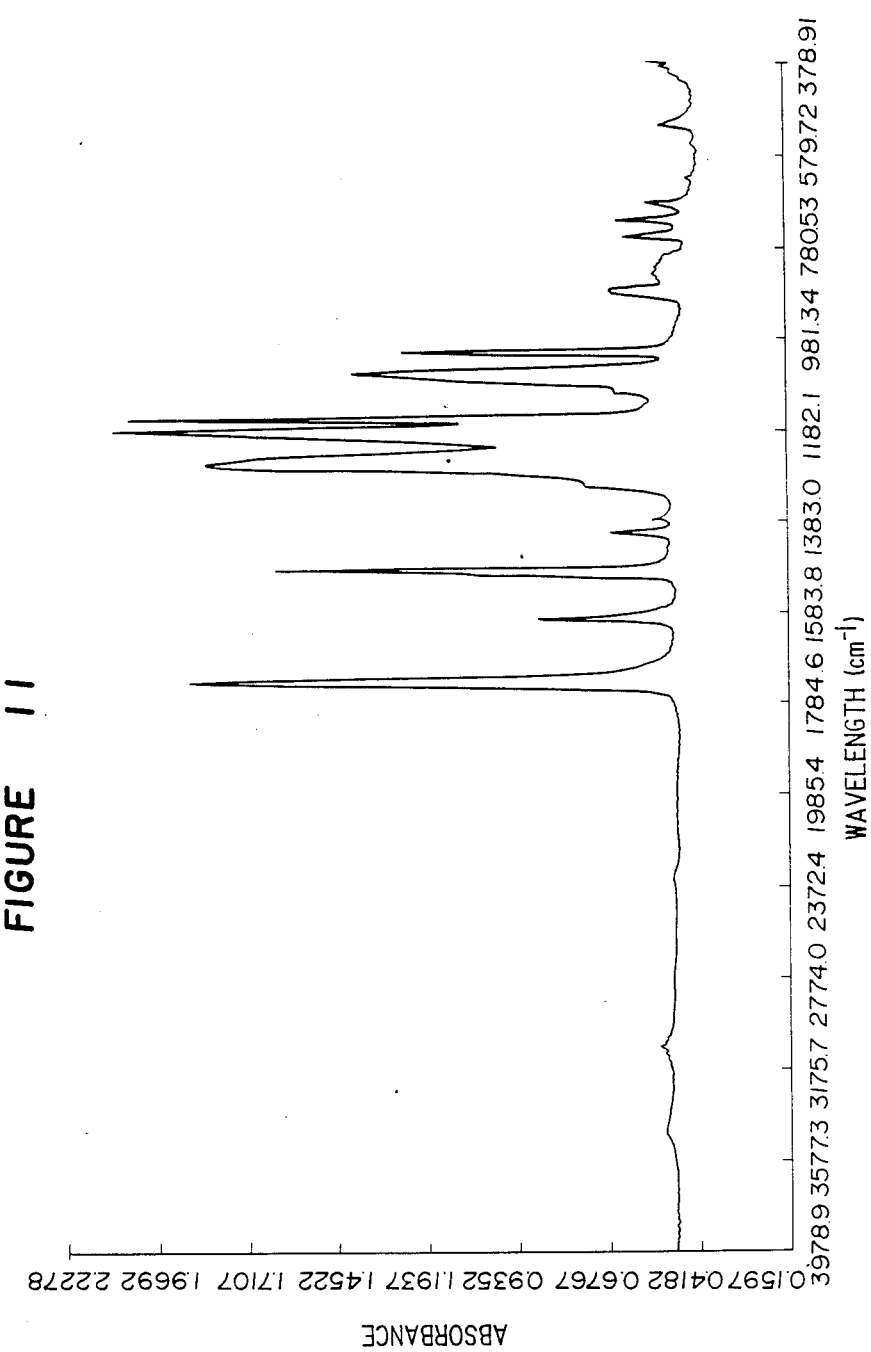
Figure 12:
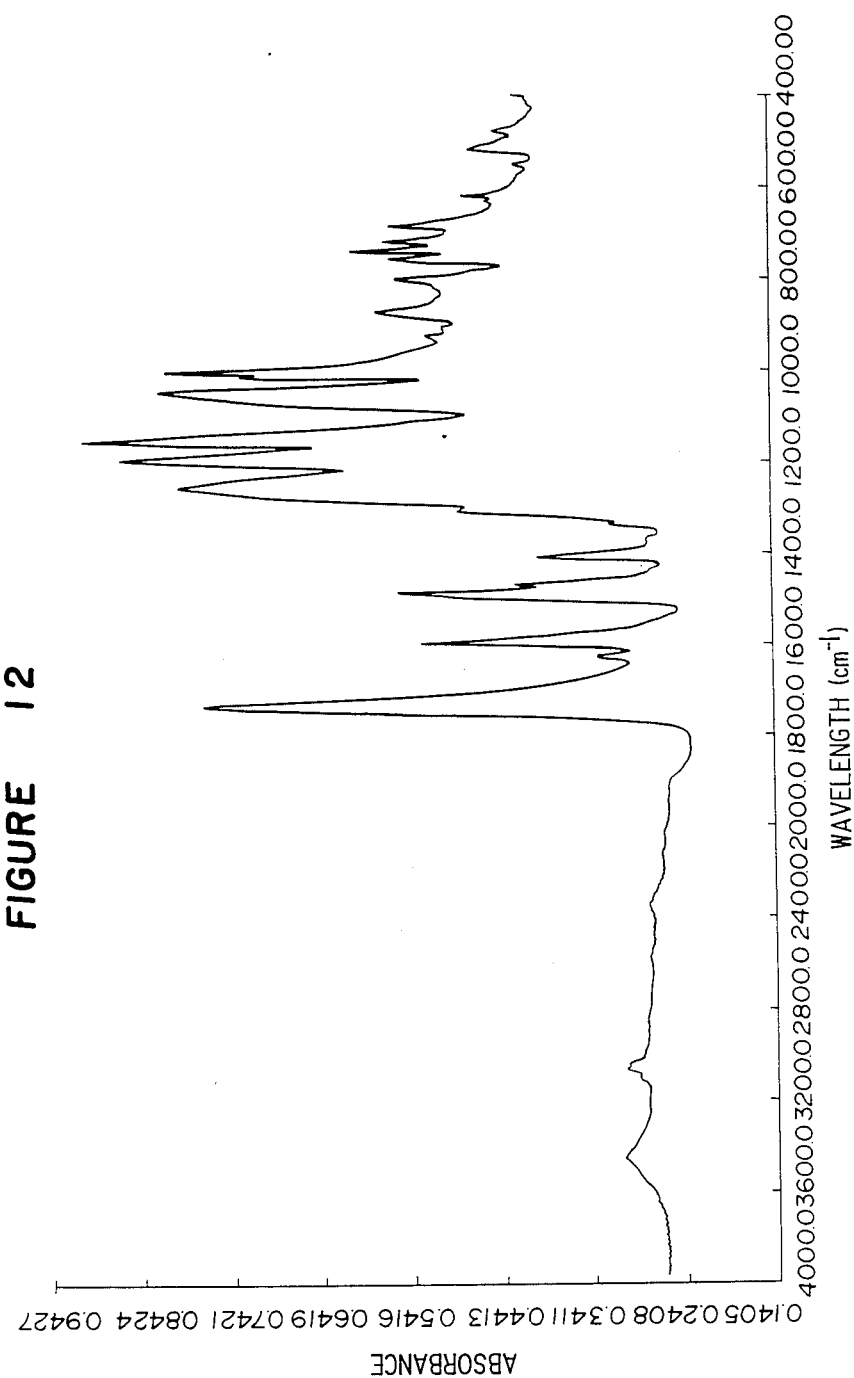
Figure 13:
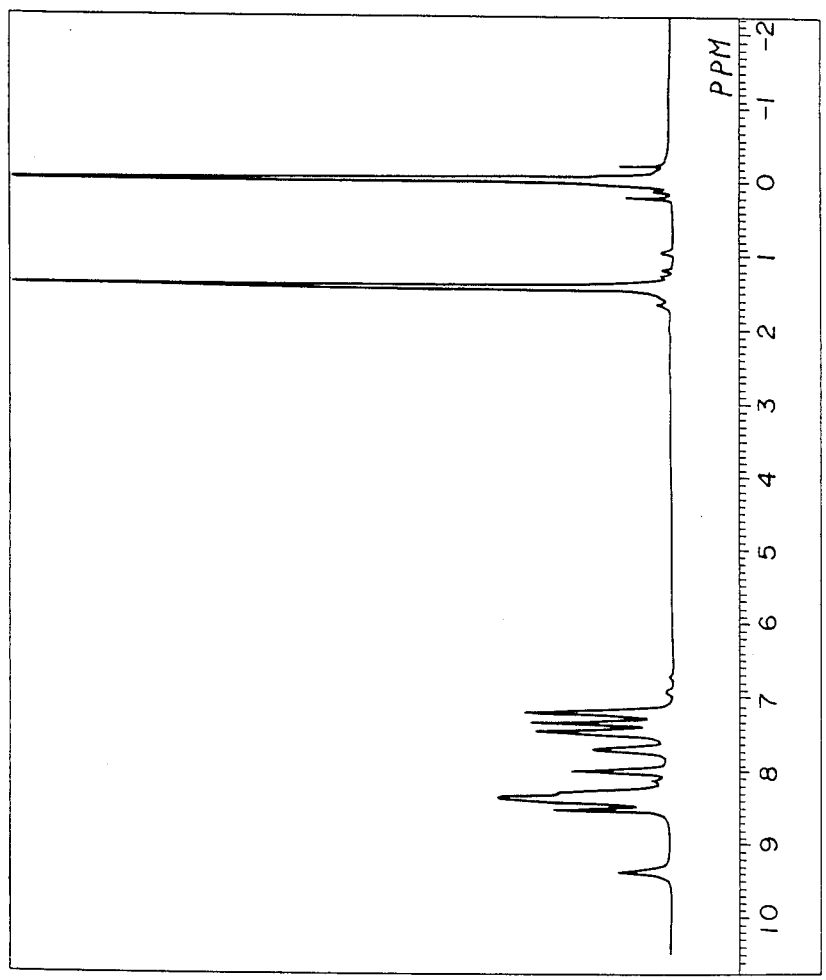
Figure 14:
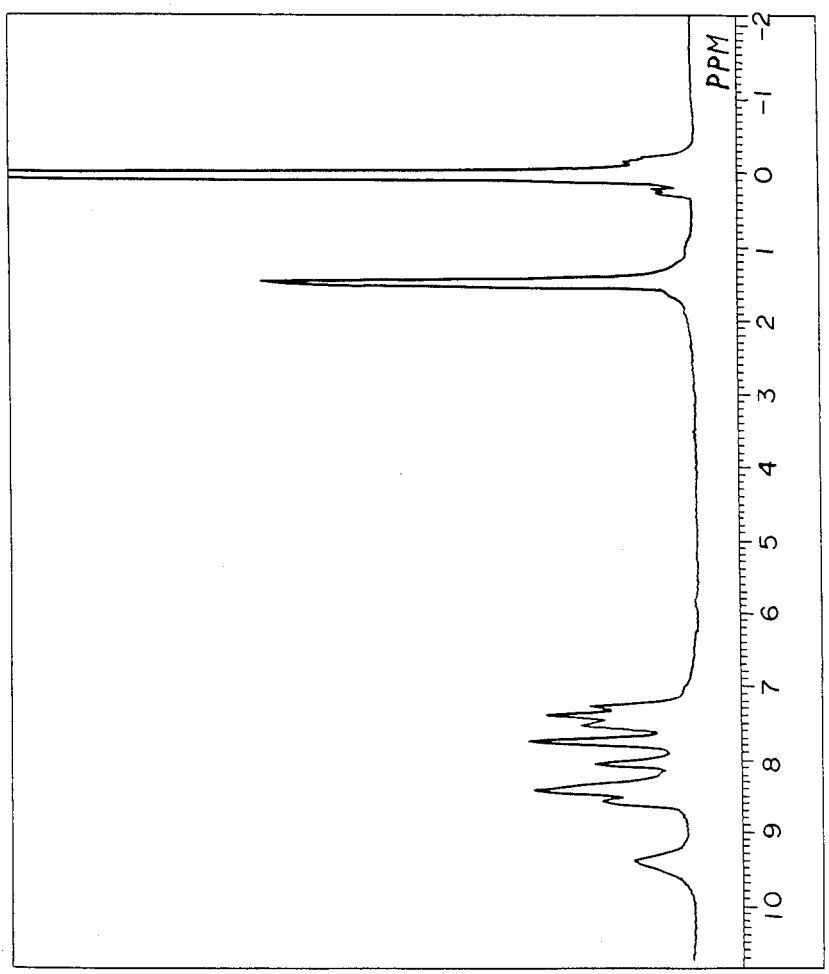
Figure 15:
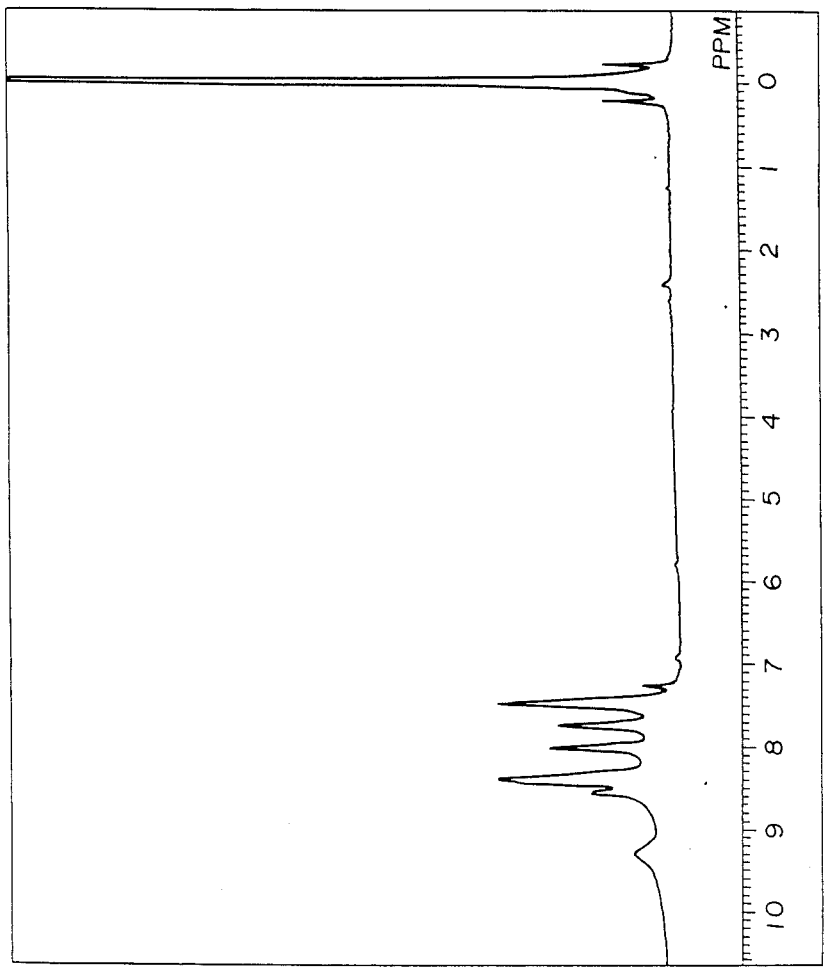
Figure 16:
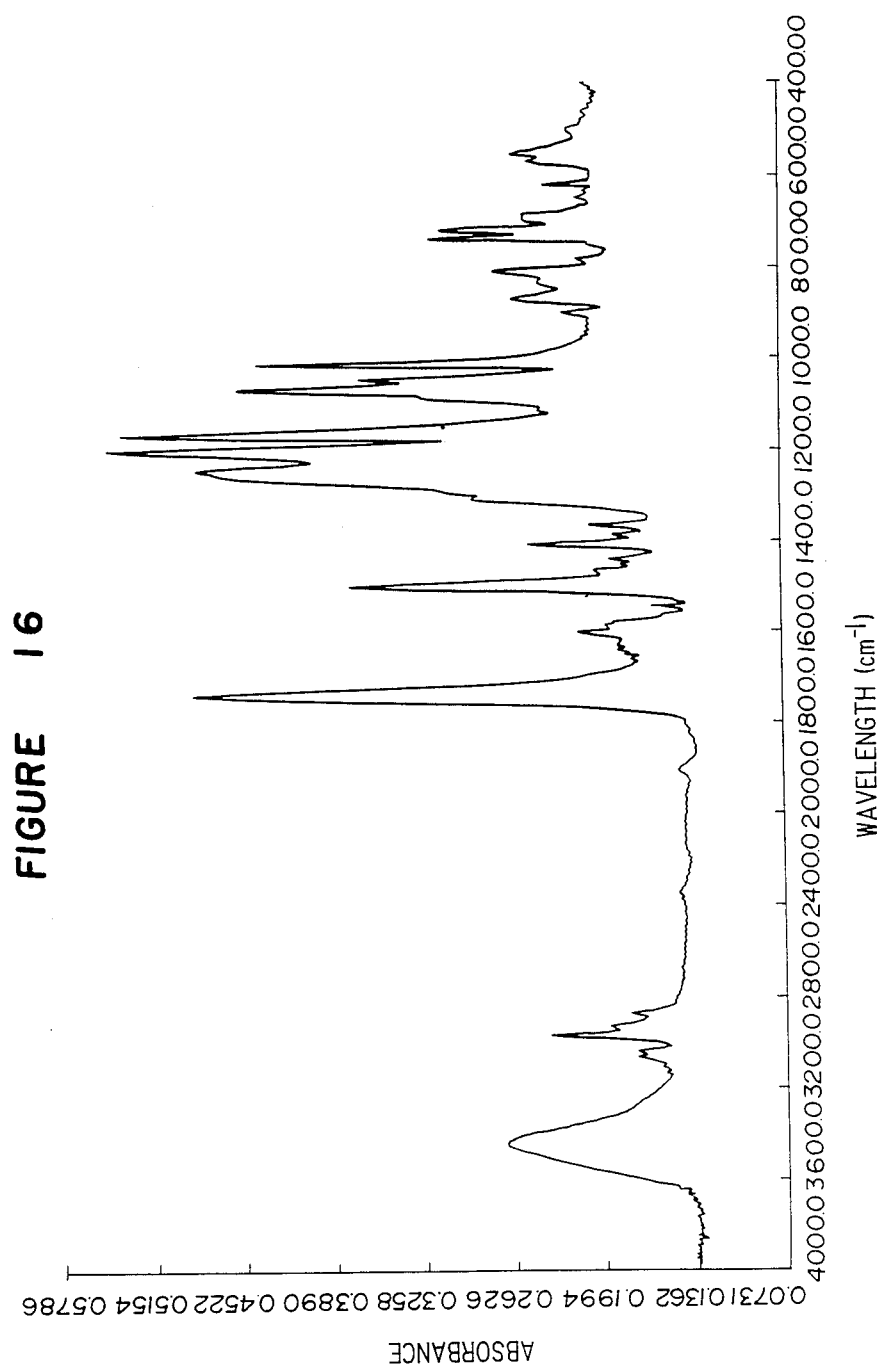
Figure 17:
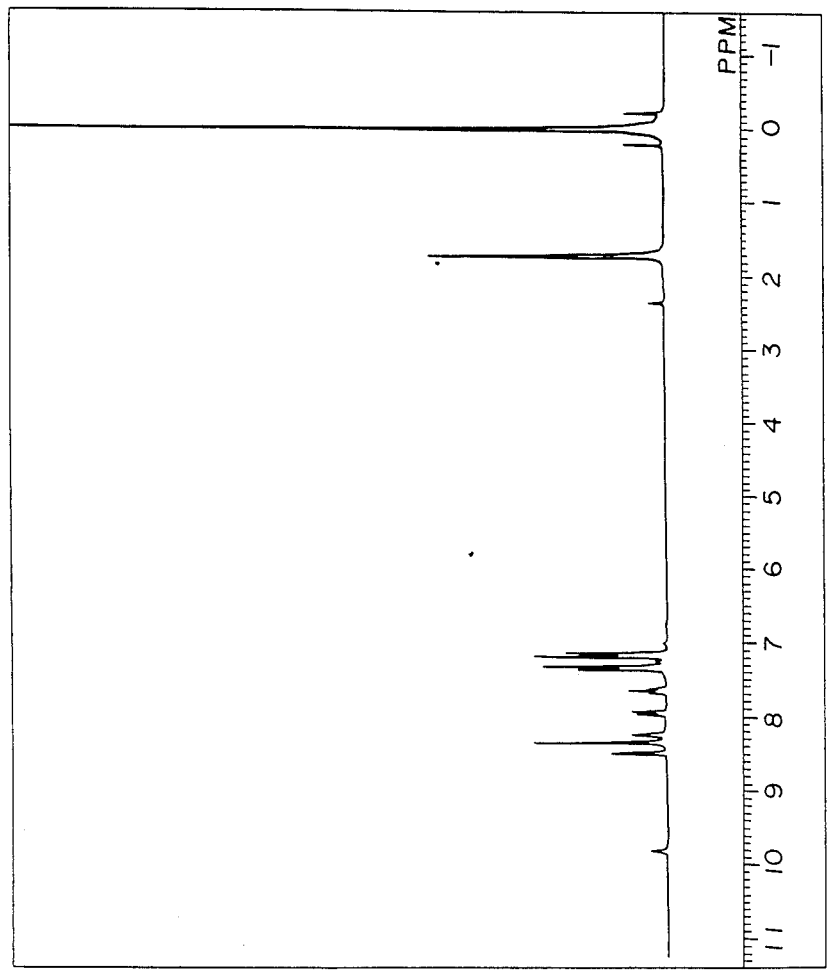

In the accompanying drawings:
FIG. 1 is a vibron chart of Example 1.
FIG. 2 is an IR chart of Example 1.
FIG. 3 is an IR chart of Example 4.
FIG. 4 is an IR chart of Example 5.
FIG. 5 is an IR chart of Example 8.
FIG. 6 is an IR chart of Example 10.
FIG. 7 is an IR chart of Example 11.
FIG. 8 is an IR chart of Example 14.
FIG. 9 is an IR chart of Example 15.
FIG. 10 is an IR chart of Example 16.
FIG. 11 is an IR chart of Example 17.
FIG. 12 is an IR chart of Example 18.
FIG. 13 is a NMR chart of Example 8.
FIG. 14 is a NMR chart of Example 11.
FIG. 15 is a NMR chart of Example 15.
FIG. 16 is an IR chart of Example 26.
FIG. 17 is a NMR chart of Example 26.

The wholly aromatic polyester of the present invention contains the above-mentioned 3,3'-biphenyldicarboxylic acid residue (a) as an essential constituting component. Its content is from 2 to 50 equivalent %, preferably from 2 to 40 equivalent %, more preferably from 5 to 35 equivalent %, based on the total of the aromatic components being 100 equivalent %. If the content is less than 2 equivalent %, the molding processability deteriorates, such being undesirable.

The wholly aromatic polyester of the present invention may contain the aromatic dicarboxylic acid residue (b) of the formula 2 as a constituting component. Each of $R^1$, $R^4$ and $R^5$ in the formula 2 may be a bivalent benzene residue, a naphthalene residue or a diphenyl residue.

Specific examples of the aromatic dicarboxylic acid residue (b) of the formula 2 include residues of aromatic dicarboxylic acids such as terephthalic acid, isophthalic acid, naphthalene-2,6-dicarboxylic acid, naphthalene-1,5-dicarboxylic acid, diphenyl-4,4'-dicarboxylic acid, methyl terephthalic acid methyl isophthalic acid, diphenylether-4,4'-dicarboxylic acid, diphenylthioether-4,4'-dicarboxylic acid, diphenylsulfone-4,4'-dicarboxylic acid, diphenylketone-4,4'-dicarboxylic acid, 2,2-diphenylpropane-4,4'-dicarboxylic acid and diphenyl terephthalate, diphenylketone-3,4'-dicarboxylic acid. However, the residue (b) of the formula 2 is not limited to such specific examples. Further, these residues may be used in combination as a mixture of two or more.

The content of the component (b) is within a range of from 0 to 50 equivalent %, preferably from 0 to 45 equivalent %, more preferably from 10 to 40 equivalent %, based on the total of the aromatic components being 100 equivalent %.

The wholly aromatic polyester of the present invention also contains the aromatic dioxy compound residue (c) of the formula 3 as a constituting component. $R^2$ in the formula 3 is a group of the formula

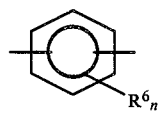

wherein $R^6$ is a $C_1$-$C_4$ alkyl group or a phenyl group and n is an integer of from 0 to 4,

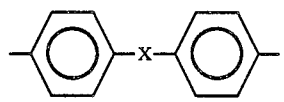

wherein X is as defined above,

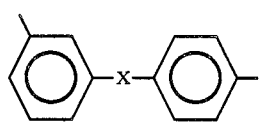

wherein X is as defined above, and/or

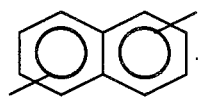

Specific examples of the aromatic dioxy compound residue of the formula 3 include residues of e.g. hydroquinone, resorcinol, methylhydroquinone, t-butylhydroquinone, 2,5-di-t-butylhydroquinone, 2,6-di-t-butylhydroquinone, methylhydroquinone diacetate, t-butylhydroquinone diacetate, 2,4,5-trimethylresorcinol, 2,3,5-trimethylhydroquinone, 1,4-hydroxynaphthalene, 1,5-dihydroxynaphthalene, 1,6-dihydroxynaphthalene, 2,6-dihydroxynaphthalene, 2,7-dihydroxynaphthalene, 2,2-bis(4-hydroxyphenyl)propane, 2-(3-hydroxyphenyl)-2-(4-hydroxyphenyl)propane, bis(4-hydroxyphenyl)methane, 1,1-bis(4-hydroxyphenyl)cyclohexane, 4,4'-dihydroxydiphenyl, bis(4-hydroxyphenyl)ketone, bis(4-hydroxyphenyl)sulfide, bis(4-hydroxyphenyl)sulfone, bis(4-hydroxyphenyl)ether, (4-hydroxyphenyl)-4-hydroxybenzoate, 3,4'-dihydroxydiphenylsulfone and 3,4'-dihydroxybenzophenone. However, the residue (c) of the formula 3 is not restricted to such specific examples. Further, these residues may be used in combination as a mixture of two or more.

The content of the component (c) is within a range of from 10 to 52 equivalent %, preferably from 15 to 50 equivalent %, more preferably from 20 to 50 equivalent %, based on the total of the aromatic components being 100 equivalent %.

The wholly aromatic polyester of the present invention may further contain the aromatic oxycarboxylic acid residue (d) of the formula 4 as a constituting component. Each of $R^3$, $R^4$ and $R^5$ in the formula 4 may be a bivalent benzene residue, a naphthalene residue or a diphenyl residue.

Specific examples of the aromatic oxycarboxylic acid residue (d) of the formula 4 include residues of e.g. p-hydroxybenzoic acid, m-hydroxybenzoic acid, syringic acid, vanilic acid, 4-hydroxy-4'-carboxydiphenyl ether, 4-hydroxy-4'-carboxybiphenyl, 2,6-dichloro-p-hydroxybenzoic acid, 2-chloro-p-hydroxybenzoic acid, 2,6-difluoro-p-hydroxybenzoic acid, 2-hydroxy-6-naphthoic acid, 2-hydroxy-3-naphthoic acid, 1-hydroxy-4-naphthoic acid and p-acetoxybenzoic acid. These residues may be used in combination as a mixture.

The content of the component (d) is within a range of from 0 to 80 equivalent %, preferably from 0 to 75 equivalent %, more preferably from 10 to 70 equivalent %, based on the total of the aromatic components being 100 equivalent %.

The wholly aromatic polyester of the present invention may be produced by treating predetermined proportions of a 3,3'-biphenyldicarboxylic acid for the residue (a), an aromatic dicarboxylic acid containing the residue (b), an aromatic dioxy compound containing the residue (c) and an aromatic oxycarboxylic acid containing the residue (d), or their derivatives, as starting materials, by a well known polymerization method such as a melt polymerization method, a solution polymerization method or an interfacial polymerization method. A melt polymerization is particularly advantageous for industrial production since no after-treatment is required after the polymerization reaction. Further, the solution polymerization and the interfacial polymerization have an advantage that the polymerization reaction can be conducted at a relatively low temperature.

In the case of a melt polymerization, it is usual to employ a method wherein a part of the starting components is used in the form of an acylated product or ester and the polymerization is conducted at a temperature range from 200° to 400° C. or a method wherein the polymerization is conducted after acylation reaction is completed by adding an acylating agent to the above-mentioned starting components.

In the solution polymerization method or the interfacial polymerization, it is usual to employ an acid halide, particularly an acid chloride, as the starting monomer corresponding to the carboxylic acid residue, and in the interfacial polymerization, the oxy residue of the starting material is required to be in the form of a salt.

The wholly aromatic polyester of the present invention is required to have a melt viscosity of at least 50 poise at 275° C. at 100 sec$^{-1}$. If the melt viscosity is less than 50 poise, no adequate mechanical strength will be obtained. The melt viscosity is preferably more than 100 poise, more preferably from 100 to 50,000 poise as measured at 275° C. at 100 sec$^{-1}$, from the viewpoint of moldability. Particularly preferred is the one having a melt viscosity of at least 50 poise as measured at 320° C. at 100 sec$^{-1}$. When the polyester does not melt at 275° C., the melt viscosity is regarded as $\infty$, which is included in the scope of the present invention.

A first preferred embodiment of the present invention is a wholly aromatic polyester which exhibits optical anisotropy in the molten phase (i.e. exhibits a liquid crystal phase) and therefore is excellent in the moldability (fluidity) and which has a high elastic modulus and excellent heat resistance and is capable of being produced by a conventional apparatus.

Such a wholly aromatic polyester comprises the above-mentioned 3,3'-biphenyldicarboxylic acid residue (a) and an aromatic dicarboxylic acid residue (e) of the formula:

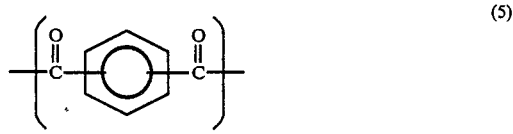

(5)

as the essential components.

Further, this wholly aromatic polyester contains an aromatic oxycarboxylic acid residue (f) of the formula:

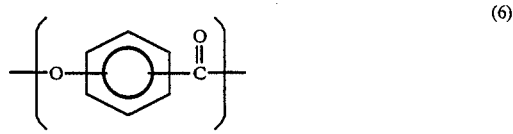

(6)

Namely, this embodiment provides a wholly aromatic polyester comprising:

(a) from 2 to 40 equivalent % of 3,3'-biphenyldicarboxylic acid residue of the formula:

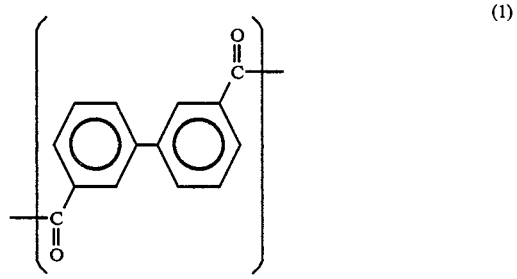

(1)

(e) from 5 to 45 equivalent % of an aromatic dicarboxylic acid residue of the formula:

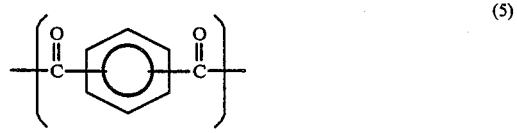

(5)

(c) from 15 to 45 equivalent % of an aromatic dioxy compound residue of the formula:

$$+O-R^2-O+ \quad (3)$$

wherein $R^2$ is a group of the formula

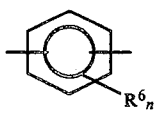

wherein $R^6$ is a $C_1$-$C_4$ alkyl group or a phenyl group and n is an integer of from 0 to 4,

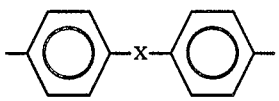

wherein X is an oxygen atom, a sulfur atom, a sulfonyl group, a carbonyl group, an alkylene group, an ester group or a direct bond,

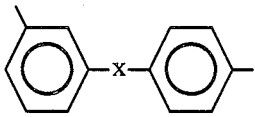

wherein X is as defined above, and/or

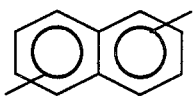

and (f) from 10 to 75 equivalent % of an aromatic oxycarboxylic acid residue of the formula:

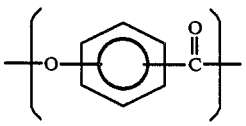

the total of the residues (a), (e), (c) and (f) being from 90 to 100 equivalent %.

It has been found surprisingly that by the presence of these constituting components, the resulting polymer exhibits optical anisotropy in the molten phase (i.e. exhibits liquid crystal properties), and thus it is possible to obtain a wholly aromatic polyester which is excellent in the moldability and has a high elastic modulus and excellent heat resistance and which is capable of being produced by a conventional apparatus.

In particular, it has been found that there is a substantial merit in that by virtue of the 3,3'-biphenyldicarboxylic acid residue (a), it is possible to withdraw the polymer from the bottom of the vessel by using a conventional apparatus for the production of a polyester such as a conventional vertical apparatus for the production of polyethylene terephthalate.

This is considered attributable to that by the combination of the 3,3'-biphenyldicarboxylic acid residue (a) with the components (e) and (f), the flow initiating temperature lowers.

On the other hand, from the viewpoint of the physical properties, a polymer having excellent heat resistance can be obtained. For example, the product has the following characteristics:

$|E^*|_{100}/|E^*|_{40} \geq \frac{1}{2}$
$|E^*|_{100} \geq 3.0 \times 10^{10}$ dyne/cm$^2$
$|E^*|_{40} \geq 7.0 \times 10^{10}$ dyne/cm$^2$ where $|E^*|_{40}$ and $|E^*|_{100}$ are the complex elastic moduli $|E^*|$ measured by vibron (110 Hz) at 40° C. and 100° C., respectively. By suitably selecting the composition, it is possible to have the following complex elastic moduli:

$|E^*|_{100}/|E^*|_{40} \geq \frac{2}{3}$
$|E^*|_{100} \geq 5.0 \times 10^{10}$
$|E^*|_{40} \geq 9.0 \times 10^{10}$ Further, from the viewpoint of rheology, the melt viscosity is low, and the moldability is excellent. The inherent viscosity $\eta_{inh}$ is as low as not higher than 1.5 as defined hereinafter, although in many cases, the intrinsic viscosity may not be measured.

These results are attributable to the specific structure of the 3,3'-biphenyldicarboxylic acid residue.

U.S. Pat. No. 4,447,593 describes the 3,3'-biphenyldicarboxylic acid residue as a para-oriented compound. However, as is evident from the molecular model, it resembles meta-oriented rather than para-oriented. While the meta-oriented isophthalic acid residue or 2,6-naphthalenedicarboxylic acid residue has carboxylic acid residues in the same plane, the 3,3'-biphenyldicarboxylic acid residue is twisted so that the carboxylic acid residues are not in the same plane.

This is believed to be the reason for the above described interesting phenomena.

Further, when the 2,2'-biphenylcarboxylic acid residue is employed, the withdrawal from the vessel is poor, and the melt phase does not exhibit liquid crystal properties. This also proves the significance of the use of the 3,3'-biphenyldicarboxylic acid residue.

The content of the 3,3'-biphenyldicarboxylic acid is from 2 to 40 equivalent %, preferably from 2 to 35 equivalent %, more preferably from 3 to 30 equivalent %, based on the total of the aromatic components being 100 equivalent %. If the content is less than 2 equivalent %, the withdrawal from the vessel tends to be poor, such being undesirable. If the content exceeds 40 equivalent %, the melt phase tends to show no liquid crystal properties, such being undesirable.

This wholly aromatic polyester contains the aromatic dicarboxylic acid residue (e) of the formula 5 as an essential constituting component. By the combination of this component (e) with the component (a), the withdrawal from the vessel can be improved and the flow initiating temperature can be lowered as mentioned above. If this component is absent, the melt phase will not show liquid crystal properties, and the fluidity tends to be poor, and the elastic modulus tends to be low.

Specific examples of the aromatic dicarboxylic acid residue (e) of the formula 5 include terephthalic acid and isophthalic acid. These may be used in combination as a mixture. However, it is preferred to employ terephthalic acid alone.

The content of the component (e) is within a range of from 5 to 45 equivalent %, preferably from 8 to 40 equivalent %, more preferably from 10 to 35 equivalent %, based on the total of the aromatic components being 100 equivalent %.

This wholly aromatic polyester also contains the aromatic dioxy compound residue (c) of the formula 3 as a constituting component.

R² in the formula 3 is a group of the formula

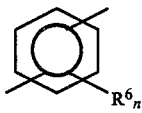

wherein R⁶ is a $C_1$–$C_4$ alkyl group or a phenyl group and n is an integer of from 0 to 4,

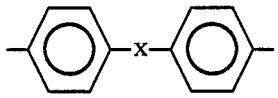

wherein X is as defined above,

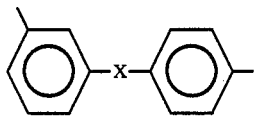

wherein X is as defined above, and/or

Specific examples of the aromatic dioxy compound residue (c) of the formula 3 include residues of e.g. hydroquinone, resorcinol, methylhydroquinone, t-butylhydroquinone, 2,5-di-t-butylhydroquinone, 2,6-di-t-butylhydroquinone, methylhydroquinone diacetate, t-butylhydroquinone diacetate, 2,4,5-trimethylresorcinol, 1,4-hydroxynaphthalene, 1,5-dihydroxynaphthalene, 1,6-dihydroxynaphthalene, 2,6-dihydroxynaphthalene, 2,7-dihydroxynaphthalene, 2,2-bis(4-hydroxyphenyl)propane, 2(3-hydroxyphenyl)-2-(4-hydroxyphenyl)propane, bis(4-hydroxyphenyl)methane, 1,1-bis(4-hydroxyphenyl)cyclohexane, 4,4'-dihydroxydiphenyl, bis(4-hydroxyphenyl)ketone, bis(4-hydroxyphenyl)sulfide, bis(4-hydroxyphenyl)sulfone, bis(4-hydroxyphenyl)ether, (4-hydroxyphenyl)-4-hydroxybenzoate, 3,4'-dihydroxydiphenylsulfone and 3,4'-dihydroxybenzophenone. However, the residue (c) of the formula 3 is not restricted to such specific examples. Further, these residues may be used in combination as a mixture.

Among them, hydroquinone, t-butylhydroquinone, methylhydroquinone, 4,4'-dihydroxydiphenyl and 2,6-dihydroxynaphthalene are particularly preferred. When a substituent is introduced into hydroquinone, if the substituent is bulky, the liquid crystal properties tend to be hardly obtainable or the flow initiating temperature tends to be high, such being undesirable.

The content of the residue (c) is within a range of from 12 to 45 equivalent %, preferably from 15 to 40 equivalent %, more preferably from 20 to 40 equivalent %, based on the total of the aromatic components being 100 equivalent %.

The wholly aromatic polyester of this embodiment further contains the aromatic oxycarboxylic acid residue (f) of the formula 6 has a constituting component.

Specific examples of the aromatic oxycarboxylic acid residue (f) of the formula 6 include residues of e.g. p-hydroxybenzoic acid and m-hydroxybenzoic acid. These residues may be used in combination as a mixture. It is particularly preferred to employ the residue of p-hydroxybenzoic acid.

The content of the residue (f) is within a range of from 10 to 75 equivalent %, preferably from 15 to 70 equivalent %, more preferably from 20 to 60 equivalent %, based on the total of the aromatic components being 100 equivalent %.

The total of the residues (a), (e), (c) and (f) is from 90 to 100 equivalent %. Thus, the wholly aromatic polyester may further contain (g) from 0 to 10 equivalent % of a residue of the formula:

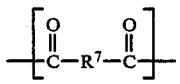
(11)

wherein R⁷ is R¹ less

and/or

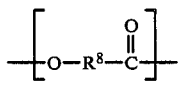
(12)

wherein R⁸ is R³ less

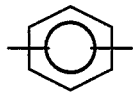

It is preferred that the residue of the formula 11 is less than the equivalent % of the residue (e) and the residue of the formula 12 is less than the equivalent % of the residue (f). Each of R⁷ and R⁸ is preferably

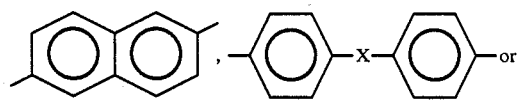

wherein X is an oxygen atom, a sulfur atom, a sulfonyl group, a carbonyl group, an ester group or a direct bond.

A second preferred embodiment of the present invention is a wholly aromatic polyester which has a high modulus of elasticity as a liquid crystal polymer and with the anisotropy moderated i.e. with the $E_{MD}/E_{TD}$ ratio being small.

Such a wholly aromatic polyester contains the 3,3'-biphenyldicarboxyic acid residue (a) and the aromatic dicarboxylic acid residue (e) of the formula 5 as essential components. It is also essential that this wholly aromatic polyester does not contain the aromatic oxycarboxylic acid residue (d) of the formula 4.

Namely, the second preferred embodiment provides a wholly aromatic polyester comprising:

(a) from 2 to 45 equivalent % of a 3,3'-biphenyldicarboxylic acid residue of the formula:

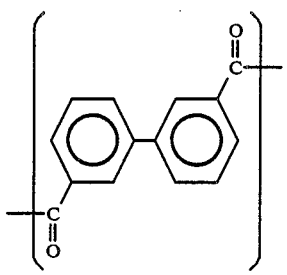  (1)

(e) from 5 to 48 equivalent % of an aromatic dicarboxylic acid residue of the formula:

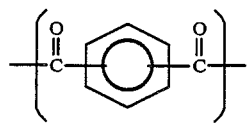  (5)

and (c) about 50 equivalent % of an aromatic dioxy compound residue of the formula:

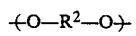  (3)

wherein $R^2$ is a group of the formula

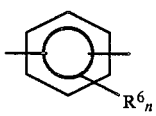

wherein $R^6$ is a $C_1$-$C_4$ alkyl group or a phenyl group and n is an integer of from 0 to 4,

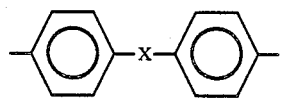

wherein X is an oxygen atom, a sulfur atom, a sulfonyl group, a carbonyl group, an alkylene group, an ester group or a direct bond,

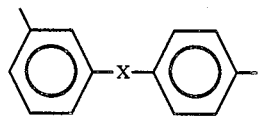

wherein X is as defined above, and/or

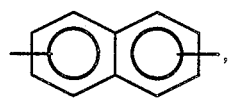, the total of the residues (a) and (e) being about the same equivalent % as the residue (c), and the total of the residues (a), (e) and (c) being from 90 to 100 equivalent %.

It is surprising that in the absence of the component (d), the heat resistance improves, and it is possible to obtain a liquid crystal polyester with its anisotropy moderated.

Specific examples of the aromatic dicarboxylic acid residue (e) of the formula 5 and the aromatic dioxy compound residue (c) of the formula 3 are the same as those described hereinbefore. Particularly preferred are hydroquinone, t-butylhydroquinone, methylhydroquinone, 4,4'-dihydroxydiphenyl and 2,6-dihydroxynaphthalene.

It has been found surprisingly that by the presence of these constituting components, the resulting polymer exhibits optical anisotropy in the molten phase (i.e. exhibits liquid crystal properties), and thus it is possible to obtain a wholly aromatic polyester which is excellent in the moldability and has a high elastic modulus and excellent heat resistance. It is also possible to obtain a wholly aromatic polyester which has a high elastic modulus as a liquid crystal polymer and with the anisotropy moderated to some extent i.e. with the $E_{MD}/E_{TD}$ ratio being small.

The content of the component (a) is within a range of from 2 to 45 equivalent %, preferably from 5 to 40 equivalent %, more preferably from 10 to 35 equivalent %, based on the total of the aromatic components being 100 equivalent %. If the content is less than 2 equivalent %, the degree of the decrease of the anisotropy tends to be small. On the other hand, if the content exceeds 45 equivalent %, the melt-phase will not show liquid crystal properties, such being undesirable.

This wholly aromatic polyester contains the aromatic dicarboxylic acid residue (e) of the formula 5 as an essential constituting component. By the combination of this component (e) with the component (a), the above-mentioned properties can be obtained. If this component is absent, the melt-phase will not show liquid crystal properties, and the fluidity tends to be poor, and the elastic modulus tends to be low.

Specific examples of the aromatic dicarboxylic acid residue (e) of the formula 5 include terephthalic acid and isophthalic acid. These may be used in combination as a mixture. However, it is preferred to employ terephthalic acid alone.

The content of the component (e) is within a range of from 5 to 48 equivalent %, preferably from 10 to 45 equivalent %, more preferably from 15 to 40 equivalent %, based on the total of the aromatic components being 100 equivalent %. If the content is less than 5 equivalent %, the degree of the decrease of the anisotropy tends to be small. On the other hand, if the content exceeds 48 equivalent %, the melt-phase will not show liquid crystal properties, such being undesirable.

The content of the component (c) is about 50 equivalent %.

The total of the residues (a), (e) and (c) is from 90 to 100 equivalent %. Namely, the wholly aromatic polyester of this embodiment may further contain (h) from 0 to 10 equivalent % of a residue of the formula:

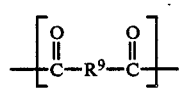
(13)

wherein $R^9$ is $R^1$ less

The content of the component (h) is preferably from 0 to 5 equivalent %. Further, the content of the component (h) is preferably less than the equivalent % of the component (e).

$R^9$ in the formula 13 is the same as $R^7$ and is preferably

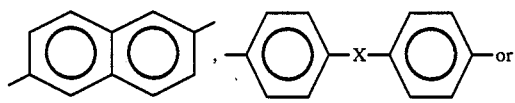 or

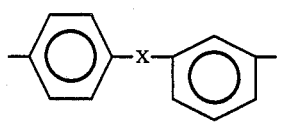

wherein X is as defined above.

A third preferred embodiment of the present invention is a wholly aromatic polyester which has a melt viscosity lower than the conventional wholly aromatic polyester obtained by a combination of terephthalic acid and isophthalic acid and thus has excellent fluidity (i.e. moldability) and well balanced heat resistance and moldability and which is capable of being produced by a conventional apparatus.

Such a wholly aromatic polyester comprises:

(a) from 5 to 45 equivalent % of a 3,3'-biphenylcarboxylic acid residue of the formula:

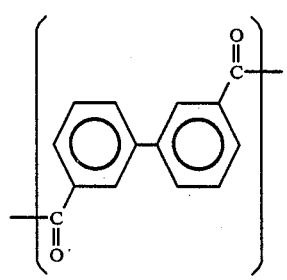
(1)

(e) from 5 to 45 equivalent % of an aromatic dicarboxylic acid residue of the formula:

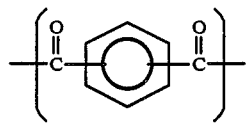
(5)

and (c) about 50 equivalent % of an aromatic dioxy compound residue selected from the group consisting of a 2,2-bis(4-hydroxyphenyl)propane residue, a bis(4-hydroxyphenyl)sulfone residue, a bis(4-hydroxyphenyl)ether residue and a resorcinol residue, the total of the residues (a) and (e) being about 50 equivalent %, and the total of the residues (a), (e) and (c) being 100 equivalent %.

As mentioned above, the wholly aromatic polyester of the present invention may be produced by treating predetermined proportions of a 3,3'-biphenyldicarboxylic acid for the residue (a), an aromatic dicarboxylic acid containing the residue (b), an aromatic dioxy compound containing the residue (c) and an aromatic oxycarboxylic acid containing the residue (d), or their derivatives, as starting materials, by a well known polymerization method such as a melt polymerization method, a solution polymerization method or an interfacial polymerization method. A melt polymerization is particularly advantageous for industrial production since no after-treatment is required after the polymerization reaction. Further, the solution polymerization and the interfacial polymerization have an advantage that the polymerization reaction can be conducted at a relatively low temperature.

In the case of a melt polymerization, it is usual to employ a method wherein a part of the starting components is used in the form of an acylated product or ester and the polymerization is conducted at a temperature of from 200° to 400° C. or a method wherein the polymerization is conducted by adding an acylating agent to the above-mentioned starting components.

In the solution polymerization or the interfacial polymerization, it is usual to employ an acid halide, particularly an acid chloride, as the starting monomer corresponding to the carboxylic acid residue, and in the interfacial polymerization, the oxy residue of the starting material is required to be in the form of a salt.

The present invention further provides a process for producing the wholly aromatic polyester which is superior from the viewpoint of the production cost and operation efficiency. Namely, the process of the present invention comprises reacting (i) a 3,3'-biphenyldicarboxylic acid of the formula:

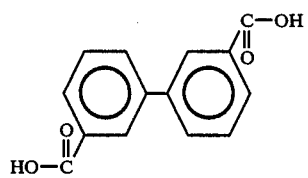
(7)

(j) an aromatic dicarboxylic acid of the formula:

(8)

wherein $R^1$ is as defined above, (k) an aromatic dihydroxy compound of the formula:

$$HO-R^2-OH \quad (9)$$

wherein $R^2$ is as defined above, and (l) an aromatic hydroxy carboxylic acid of the formula:

$$HO-R^3-\overset{O}{\underset{\|}{C}}-OH \quad (10)$$

wherein $R^3$ is as defined above, or their derivatives in the presence of an acid anhydride, followed by reaction at a temperature of from 100° to 400° C., while distilling off the acid and acid anhydride.

The proportions of the starting materials of the formulas 7 to 10 are suitably selected to bring the composition of the resulting polymer to from 2 to 50 equivalent % of the residue (a), from 0 to 50 equivalent % of the residue (b), from 10 to 52 equivalent % of the residue (c) and from 0 to 80 equivalent % of the residue (d).

As a catalyst, $BuSnOOH$, $Bu_2SnO$, $Ti(OiPr)_4$, $Zn(OAc)_2$ or $Sn(OAc)_2$ etc. may be employed. However, such a catalyst may not be used.

As the acid anhydride, acetic anhydride, propionic anhydride or benzoic anhydride may be mentioned. Particularly preferred is acetic anhydride. The molar ratio of the acid anhydride is preferably from 0.8 to 2.0, particularly from 1.0 to 1.5, relative to the sum of twice the amount by mol of the dihydroxy compound of the formula (9) and the amount by mol of the hydroxycarboxylic acid of the formula (10).

The reaction temperature is usually within a range of from 100° to 400° C. It is preferred, however, that the acylation by the addition of an acid anhydride is conducted within a range of from 100° to 200° C., and the subsequent condensation is conducted within a range of from 250° to 400° C. In order to distill off the acid or acid anhydride, an inert gas such as nitrogen or argon or reduced pressure may be applied.

By adopting the above process, it is possible to withdraw the polymer of the present invention from the reactor even when a conventional vertical agitation apparatus provided with anchor vanes or helical vanes for the production of polyester, particularly polyethylene terephthalate, is employed, such being advantageous from the viewpoint of operation. When it is desired to increase the degree of polymerization, it is also possible to employ solid phase polymerization after melt polymerization.

The wholly aromatic polyester of the present invention has excellent heat resistance with a glass transition temperature (Tg) of at least 100° C., and by properly selecting the types and the proportions of the starting monomers, it is possible to obtain a product having a Tg of at least 150° C.

Further, the wholly aromatic polyester of the present invention has an important merit in that it is excellent in the moldability. Namely, a high temperature exceeding 330° C. is usually required for the molding of conventional wholly aromatic polyesters containing 4,4'-biphenyldicarboxylic acid residues. Whereas, the wholly aromatic polyester of the present invention can efficiently be molded at a lower temperature.

By virtue of such excellent properties, the wholly aromatic polyester of the present invention is applicable to injection molded products, films, fibers, etc.

The wholly aromatic polyester of the present invention is usually meltable at a temperature of not higher than 330° C. Accordingly, when it is prepared by a melt polymerization, the resulting polymer can readily be withdrawn from the reactor after the reaction by an application of pressure or by self gravity, which is advantageous from the viewpoint of operation.

Further, by properly selecting the types and the proportions of the starting monomers, it is possible to obtain a product which exhibits optical anisotropy i.e. liquid crystal properties in its molten phase (which can be ascertained by a commonly employed plarizing method by means of crossed polarizers). In such a case, it is possible to obtain molded products, films or fibers having high moduli of elasticity if it is molded at such a temperature range.

Now, the present invention will be described in further detail with reference to Examples. However, it should be understood that the present invention is by no means restricted to such specific Examples.

In the Examples, the melt viscosity was measured by using Capillary Rheometer (manufactured by Intesco Co.) at a temperature of 320° C. at a share rate ($\dot{\gamma}$) of 100 $sec^{-1}$ and with a length to diameter ratio of the cylinder nozzle being 30. Further, the glass transition temperature (Tg) was obtained by using a Scanning Calorimeter of 9900 model manufactured by duPont Co. at a temperature raising rate of 20° C./min.

The inherent viscosity $\eta_{inh}$ was measured at 30° C. at a concentration of 0.5 g/dl in a mixture of phenol/tetrachloroethane=1/1 (weight ratio).

The infrared spectrum was measured by an infrared spectrophotometer 20DXB FT-IR manufactured by Nicolet Co. The polymer was dissolved in hexafluoroisopropanol or applied to a KBr disc to obtain a test sample.

The NMR spectrum was measured by JNM-GX270 manufactured by Nipon Denshi K.K. The polymer was dissolved in trifluoroacetic acid to obtain a test sample.

A molded test piece was prepared by using a 0.1 oz injection molding machine manufactured by Nihon Seiko K.K.

The vibron was measured by using the above molded test piece at 110 Hz by means of Rheovibron manufactured by Toyo Boldwin Co.

The optical anisotropy and flow initiating temperature were measured by a hot stage-equipped polarizing microscope. The molded test piece was prepared so that the measurement can be made in its flow direction (MD) and transverse direction (TD) perpendicular to the flow direction.

EXAMPLE 1

Into a reactor equipped with stirring vanes, an evacuation outlet and a nitrogen gas inlet, 0.115 mol (27.83 g) of 3,3-biphenyldicarboxylic acid, 0.115 mol (19.09 g) of terephthalic acid, 0.23 mol (42.78 g) of 4,4'-dihydroxydiphenyl and 0.23 mol (31.74 g) of p-hydroxybenzoic acid were charged, and flushed with nitrogen under reduced pressure. After sealing with nitrogen, 0.759 mol (77.42 g) of acetic anhydride was introduced. Then, the reactor was immersed in an oil bath at 145° C., and the mixture was reacted under stirring for 1 hour. Then, the temperature was raised to 320° C. over a period of 1.5 hours. Then, the pressure was reduced from atmospheric pressure to 0.3 mmHg over a period of 30 minutes, and the reaction was further continued under 0.3 mmHg for 30 minutes at 320° C. to complete the polymerization reaction. This polymer was flowable by its own gravity and was capable of being withdrawn from the bottom of the reactor. The polymer thus obtained had a melt viscosity of 920 poise as measured at 320° C. at 100 sec$^{-1}$.

This polymer was molded into a test piece by a 0.1 oz injection molding machine. The vibron of the molded test piece was measured, and the vibron chart thus obtained is shown in FIG. 1. From the vibron, the complex elastic moduli were obtained as follows:

$|E^*|_{40} = 21.1$ GPa $|E^*|_{100} = 15.5$ GPa

Further, this polymer had a flow-initiating temperature of at least about 275° C. and showed optical anisotropy.

The IR chart of this polymer is shown in FIG. 2.

EXAMPLE 2

A polymer produced in the same manner as in Example 1 was withdrawn, pulverized and subjected to solid phase polymerization at 265° C. for 12 hours.

The melt viscosity of this polymer was as high as 29,400 poise as measured at 320° C. at 100 sec$^{-1}$.

In the same manner as in Example 1, the polymer was injection-molded, and the vibron of the molded piece was measured.

Also this polymer showed optical anisotropy.

COMPARATIVE EXAMPLE 1

A polymer was prepared in the same manner as in Example 1 except that 0.115 mol (19.09 mol) of isophthalic acid was used instead of 3,3'-biphenyldicarboxylic acid in Example 1.

This polymer solidified before the pressure was reduced to 0.3 mmHg and could not be withdrawn from the bottom of the reactor.

COMPARATIVE EXAMPLE 2

A polymer was prepared in the same manner as in Example 1 except that 0.115 mol (27.83 g) of 2,2'-biphenyldicarboxylic acid was used instead of 3,3'-biphenyldicarboxylic acid in Example 1.

Also this polymer solidified before the pressure was reduced to 0.3 mmHg, and could not be withdrawn from the bottom of the reactor. Further, this polymer did not show liquid crystal properties when melted.

COMPARATIVE EXAMPLE 3

A polymer was prepared in the same manner as in Example 1 except that 0.115 mol (27.83 g) of 4,4'-biphenyldicarboxylic acid was used instead of 3,3'-biphenyldicarboxylic acid in Example 1.

This polymer solidified before the pressure was reduced to 0.3 mmHg, and could not be withdrawn from the bottom of the reactor.

EXAMPLES 3 to 19 and COMPARATIVE EXAMPLE 4

The operation was conducted in the same manner as in Example 1 except that the constituting components (a), (b), (c) and (d) and their proportions were changed as shown in Table 1-a. The results are shown in Table 1-b.

TABLE 1a

| | Proportions (equivalent %) | | | | |
|---|---|---|---|---|---|
| | (a) | (b) | (c) | (d) | Others |
| Example 3 | 13.3 | 20 | 33.3 | 33.3 | 0 |
| Example 4 | 11.5 | 11.5 | 23.1 | 53.9 | 0 |
| Example 5 | 5.0 | 11.7 | 16.7 | 66.6 | 0 |
| Example 6 | 5.0 | 11.7 | 16.7 | 40.0 / 26.6 | 0 |

TABLE 1a-continued

| | Proportions (equivalent %) | | | | |
|---|---|---|---|---|---|
| | (a) | (b) | (c) | (d) | Others |
| Example 7 | 4,4'-biphenyl dicarbonyl, 10.0 | 1,4-benzene dicarbonyl, 23.4 | 4,4'-biphenyldiol, 33.3 | 1,4-hydroquinone, 33.3 | 0 |
| Example 8 | 4,4'-biphenyl dicarbonyl, 16.7 | 1,4-benzene dicarbonyl, 16.7 | t-Bu substituted hydroquinone, 33.3 | 1,4-hydroquinone, 33.3 | 0 |
| Example 9 | 4,4'-biphenyl dicarbonyl, 10.0 | 1,4-benzene dicarbonyl, 23.4 | t-Bu substituted hydroquinone, 33.3 | 1,4-hydroquinone, 33.3 | 0 |
| Example 10 | 4,4'-biphenyl dicarbonyl, 16.7 | 1,4-benzene dicarbonyl, 16.7 | 2,5-di-t-Bu hydroquinone, 33.3 | 1,4-hydroquinone, 33.3 | 0 |
| Comparative Example 4 | 4,4'-biphenyl dicarbonyl, 16.7 | 1,4-benzene dicarbonyl, 16.7 | 2,5-di-t-Bu hydroquinone, 33.3 | 1,4-hydroquinone, 33.3 | |

TABLE 1a-continued

| | Proportions (equivalent %) | | | | |
|---|---|---|---|---|---|
| | (a) | (b) | (c) | (d) | Others |
| Example 11 | 0 | 16.7 / 16.7 (two terephthaloyl units) | 33.3 (biphenyl diol) | 33.3 (hydroquinone) | 0 |
| Example 12 | 16.7 (3-phenylphenyl dicarbonyl) | 16.7 (terephthaloyl) | 16.7 / 16.7 (tBu-substituted hydroquinone) | 33.3 (hydroquinone) | 0 |
| Example 13 | 20 (3-phenylphenyl dicarbonyl) | 13.3 (terephthaloyl) | 33.3 (biphenyl diol) | 33.3 (hydroquinone) | 0 |
| | 10.0 (3-phenylphenyl dicarbonyl) | 10.0 / 13.4 (terephthaloyl) | 33.3 (biphenyl diol) | 33.3 (hydroquinone) | 0 |

TABLE 1a-continued
| | (a) | (b) | (c) | (d) | Others |
|---|---|---|---|---|---|
| Example 14 | 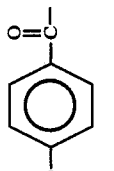 16.7 |  16.7 | 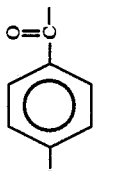 33.3 |  33.3 | 0 |
| Example 15 | 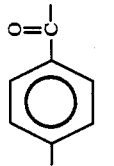 11.5 |  11.5 | 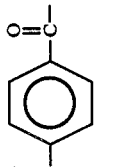 23.1 |  53.9 | 0 |
| Example 16 | 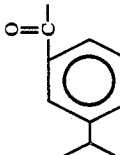 16.7 | 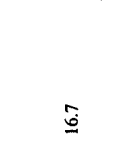 16.7 | 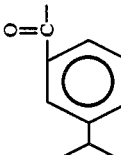 33.3 | 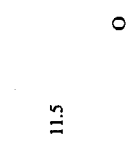 33.3 | 0 |
| Example 17 | 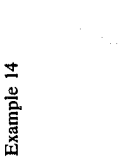 2.3 |  20.8 | 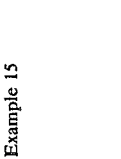 23.1 | 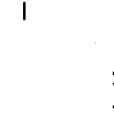 53.8 | 0 |

TABLE 1a-continued

| | (a) | (b) | (c) | (d) | Others |
|---|---|---|---|---|---|
| | | | Proportions (equivalent %) | | |
| Example 18 | 11.5 | 11.5 | 23.1 | 45.7 | 8.1 |
| Example 19 | 16.7 | 11.7 | 33.3 | 33.3 | 5.0 |

TABLE 1b

| | Polymerization | | Viscosity of the solution | Melt viscosity (poise) | Complex moduli of elasticity | | Liquid crystal properties | Flow initiating temp (°C.) | Remarks |
|---|---|---|---|---|---|---|---|---|---|
| | Temp. (20 C.) | Withdrawal from reactor | | | $\|E^*\|_{40}$ (GPa) | $\|E^*\|_{100}$ (GPa) | | | |
| Example 3 | 320 | Possible | Insoluble | 3,740 | 20.7 | 14.4 | Yes | about 260 | |
| Example 4 | 320 | Possible | Insoluble | 1,360 | 22.6 | 14.3 | Yes | about 215 | IR chart |
| Example 5 | 360 | Possible | Insoluble | 4,550 | 18.6 | 12.4 | Yes | | IR chart |
| Example 6 | 320 | Possible | Insoluble | 2,800 | | | Yes | | |
| Example 7 | 360 | Possible | Insoluble | 4,030 | 9.1 | 6.5 | Yes | | |
| Example 8 | 300 | Possible | 0.83 | 1,010 | 18.6 | 15.4 | Yes | about 165 | IR chart NMR chart |
| Example 9 | 290 | Possible | 1.06 | 540 (300° C.) | | | Yes | about 250 | |
| Example 10 | 360 | Possible | Insoluble | — | — | — | — | | IR chart |
| Comparative Example 4 | 360 | Impossible | Insoluble | — | — | — | — | | |
| Example 11 | 320 | Possible | 1.14 | 580 | 24.5 | 18.7 | Yes | about 160 | IR chart NMR chart |
| Example 12 | 320 | Possible | 1.05 | 1,240 | | | Yes | about 230 | |
| Example 13 | 320 | Possible | 0.98 | 1,300 | | | Yes | about 250 | |
| Example 14 | 320 | Possible | 0.87 | 2,100 | 12.1 | 9.6 | Yes | about 170 | IR chart |
| Example 15 | 320 | Possible | 0.81 | 510 ($\dot{\gamma}=1000$ sec$^{-1}$) | 8.5 | 7.3 | Yes | about 160 | IR chart NMR chart |
| Example 16 | 360 | Possible | Insoluble | 2,280 | | | Yes | | IR chart |
| Example 17 | 320 | Possible | Insoluble | 3,050 | 4.3 | 3.7 | Yes (weak) | about 175 | IR chart |
| Example 18 | 320 | Possible | Insoluble | | | | Yes | | IR chart |
| Example 19 | 320 | Possible | Insoluble | 2,400 | | | Yes | | |

EXAMPLE 20

Into a vertical reactor equipped with double helical stirring vanes, an evacuation outlet and a nitrogen gas inlet and having an internal capacity of 20 liters, 5.75 mol (1,392 g) of 3,3'-biphenyldicarboxylic acid, 5.75 mol (955 g) of terephthalic acid, 11.50 mol (2,139 g) of 4,4'-dihydroxydiphenyl and 11.50 mol (1,587 g) of p-hydroxybenzoic acid were charged and flushed with nitrogen under reduced pressure. After sealing with nitrogen, 38.0 mol (3,871 g) of acetic anhydride was introduced. Then, the mixture was reacted for 1 hour at 145° C. under stirring. Then, the temperature was raised to 320° C. over a period of 2.5 hours. Then, the pressure was reduced from atmospheric pressure to 0.3 mmHg over a period of 90 minutes. Then, the reaction was further continued for 1 hour under 0.3 mmHg at 320° C. to complete the polymerization reaction.

This polymer was flowable by its own gravity and capable of being withdrawn from the outlet for the reaction product provided at the bottom of the reactor as in the case of a usual polyester. The polymer thus obtained had a melt viscosity of 1,020 poise as measured at 320° C. at 100 sec$^{-1}$.

This polymer was molded into a test piece by a 0.1 oz injection molding machine, and the vibron of the molded piece was measured, whereby the results of Example 1 were reproduced as follows:

$\|E^*\|_{40} = 20.3$ GPa
$\|E^*\|_{100} = 14.4$ GPa

EXAMPLES 21 to 30 and COMPARATIVE EXAMPLES 5 to 6

The operation was conducted in the same manner as in Example 1 except that the constituting components (a), (b) and (c) and their proportions were changed as shown in Tables 2a, 2b, 3a and 3b. The results are also shown in the Tables.

TABLE 2a

| | Proportions (equivalent %) | | | |
|---|---|---|---|---|
| | (a) | (b) | (c) | Others |
| Example 21 | 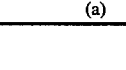 25.0 | 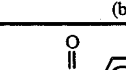 25.0 | 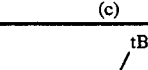 50 | 0 |

TABLE 2a-continued

| | Proportions (equivalent %) | | | |
|---|---|---|---|---|
| | (a) | (b) | (c) | Others |
| Example 22 | [3,3'-biphenyldicarbonyl]<br>25.0 | [terephthaloyl]<br>25.0 | [3-methyl-1,2-phenylenedioxy]<br>50 | |
| Example 23 | [3,3'-biphenyldicarbonyl]<br>25.0 | [terephthaloyl]<br>25.0 | [4,4'-biphenylenedioxy]<br>50.0 | |
| Comparative Example 5 | | [isophthaloyl]<br>25.0<br>[terephthaloyl]<br>25.0 | [4,4'-biphenylenedioxy]<br>50.0 | |
| Example 24 | [3,3'-biphenyldicarbonyl]<br>10 | [terephthaloyl]<br>40 | [4,4'-biphenylenedioxy]<br>50.0 | |
| Example 25 | [3,3'-biphenyldicarbonyl]<br>30 | [terephthaloyl]<br>15 | [1,4-phenylenedioxy]<br>50 | [2,6-naphthalenedicarbonyl]<br>5 |
| Example 26 | [3,3'-biphenyldicarbonyl]<br>25 | [terephthaloyl]<br>25 | [3-tert-butyl-1,2-phenylenedioxy]<br>50 | 0 |

TABLE 2b

| | Polymerization temperature | $\eta_{inh}$ | Melt viscosity (poise) | $|E^*|_{MD}$ (GPa) | $|E^*|_{TD}$ (GPa) | $\dfrac{|E^*|_{MD}}{|E^*|_{TD}}$ | Tg (°C.) | Liquid crystal properties |
|---|---|---|---|---|---|---|---|---|
| Example 21 | 290 | 0.82 | 800 (275° C.) | 11.3 | 3.9 | 2.9 | 156 | Yes |
| Example 22 | 290 | — | 370 (275° C.) | | | | 106 | Yes |
| Example 23 | 320 | Insoluble | 4,500 | 13.1 | 3.6 | 3.6 | — | Yes |
| Comparative Example 5 | 320 | Insoluble | 2,800 | 16.2 | 1.9 | 8.5 | | Yes |
| Example 24 | 320 | Insoluble | 1,600 | 9.3 | 2.9 | 3.2 | | Yes |
| Example 25 | 320 | Insoluble | 3,300 | 10.1 | 3.1 | 3.3 | | Yes |
| Example 26 | 320 | | 900 (300° C.) | | | | 156 | |

TABLE 3a

| | Proportions (equivalent %) | | |
|---|---|---|---|
| | (a) | (b) | (c) |
| Example 27 | 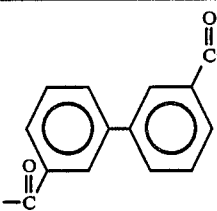<br>25 | 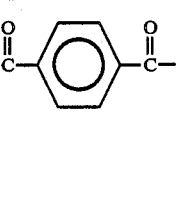<br>25 | 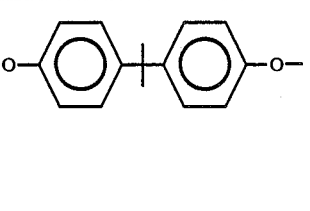<br>50 |
| Comparative Example 6 | 0 | 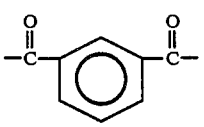<br>25<br>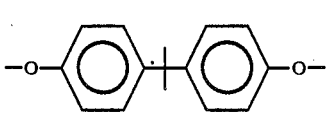<br>25 | 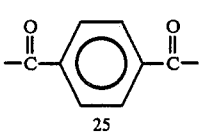<br>50 |
| Example 28 | 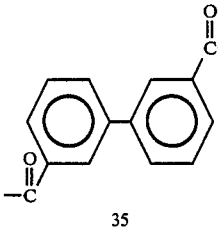<br>35 | 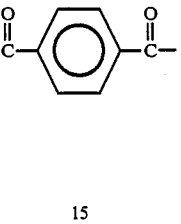<br>15 | 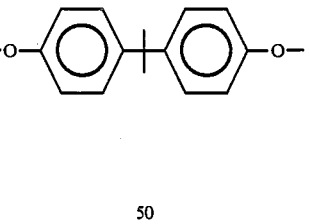<br>50 |
| Example 29 | 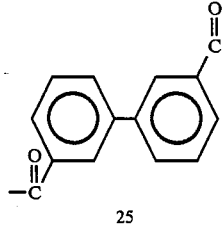<br>25 | 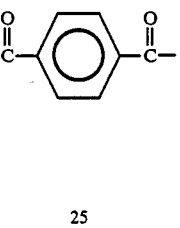<br>25 | 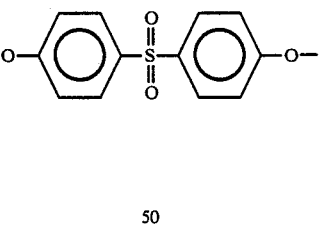<br>50 |
| Example 30 | 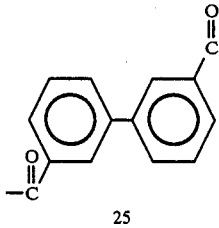<br>25 | 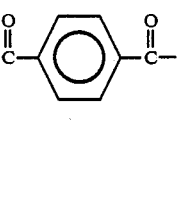<br>25 | 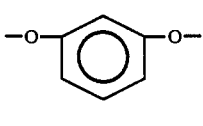<br>50 |

TABLE 3b

| | Polymerization | | Melt viscosity (poise) | Tg (°C.) |
|---|---|---|---|---|
| | Temperature (°C.) | Withdrawal from reaction | | |
| Example 27 | 320 | Possible | 8,200 | 166 |
| Comparative Example 6 | 320 | Impossible | Impossible (≧52,000) | — |
| Example 28 | 320 | Possible | 9,500 | 163 |
| Example 29 | 320 | Possible | 13,500 | 174 |
| Example 30 | 320 | Possible | 7,800 | 152 |

EXAMPLES 31 to 34

The operation was conducted in the same manner as in Example 1 except that the constituting components (a), (b) (c) and (d) and their proportions were changed as shown in Tables 4a and 4b. The results are also shown in the Tables.

TABLE 4a

| | Proportions (equivalent %) | | | | |
|---|---|---|---|---|---|
| | (a) | (b) | (c) | (d) | Others |
| Example 31 | 6.9 | 16.2 | 23.1 | 53.8 | 0 |
| Example 32 | 2.3 | 20.8 | 23.1 | 53.8 | 0 |
| Example 33 | 3.0 | 10.0 | 13.0 | 74.0 | 0 |
| Example 34 | 10 | 32 | 32 | 16.0 | 0 |

TABLE 4b

| | Polymerization | | Viscosity of the solution | Melt viscosity (poise) | Complex moduli of elasticity | | Liquid crystal properties | Flow initiating temp (°C.) | Remarks |
|---|---|---|---|---|---|---|---|---|---|
| | Temp. (°C.) | Withdrawal from reactor | | | $\|E^*\|_{40}$ (GPa) | $\|E^*\|_{100}$ (GPa) | | | |
| Example 31 | 320 | Possible | Insoluble | 820 | 21.7 | 15.1 | Yes | 263 | |
| Example 32 | 320 | Possible | Insoluble | 960 | 23.0 | 15.6 | Yes | 295 | |
| Example 33 | 320 | Possible | 1.30 | 880 | 20.9 | 15.0 | Yes | 268 | |
| Example 34 | 320 | Possible | 1.22 | 900 | 21.1 | 15.1 | Yes | 255 | |

We claim:

1. A wholly aromatic polyester consisting essentially of:

(a) from 2 to 50 equivalent % of a 3,3'-biphenyldicarboxylic acid residue of the formula:

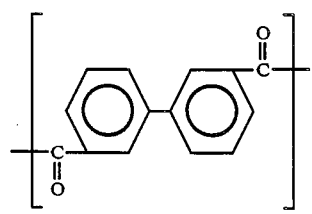

(b) from 10 to 40 equivalent % of a dicarboxylic acid residue of the formula:

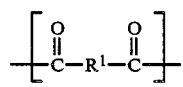

wherein $R^1$ is a bivalent aromatic hydrocarbon group or a group of the formula $R^4$—X—$R^5$ wherein each of $R^4$ and $R^5$ is a bivalent aromatic hydrocarbon group and X is an oxygen atom, a sulfur atom, a sulfonyl group, a carbonyl group, an alkylene group, an ester group or a direct bond, provided that $R^1$ is not a 3,3'-biphenyl group, (c) from 10 to 52 equivalent % of a dioxy compound residue of the formula:

$+O-R^2-O+$ (3)

wherein $R^2$ is a group of the formula

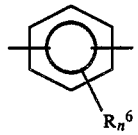

wherein $R^6$ is a $C_1$–$C_4$ alkyl group or a phenyl group and n is 0 or an integer of up to 4,

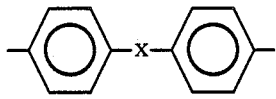

wherein X is as defined above,

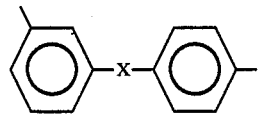

wherein X is as defined above, and/or

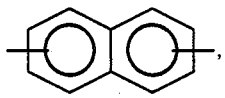

and (d) from 0 to 80 equivalent % of an oxycarboxylic acid residue of the formula:

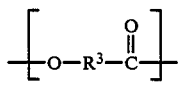 (4)

wherein $R^3$ is a bivalent aromatic hydrocarbon group or $R^4$—X—$R^5$ wherein $R^4$, $R^5$ and X are as defined above, and having a melt viscosity of at least 50 poise as measured at 275° C. at 100 sec$^{-1}$.

2. The wholly aromatic polyester according to claim 1, which is optically anisotropic in the molten phase.

3. The wholly aromatic polyester according to claim 1, wherein $R^1$ in the formula 2 is

4. The wholly aromatic polyester according to claim 1, wherein $R^3$ in the formula 4 is

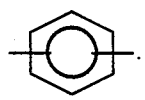

5. The wholly aromatic polyester according to claim 4, wherein the residue (d) of the formula 4 is from 0 to 75 equivalent %.

6. The wholly aromatic polyester according to claim 1, which has a glass transition temperature (Tg) of at least 100° C.

7. The wholly aromatic polyester according to claim 1, which comprises:

(a) from 2 to 40 equivalent % of a 3,3'-biphenyldicarboxylic acid residue of the formula:

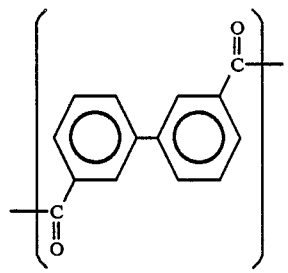 (1)

(e) from 5 to 45 equivalent % of an aromatic dicarboxylic acid residue of the formula:

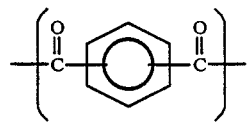 (5)

(c) from 12 to 45 equivalent % of an aromatic dioxy compound residue of the formula:

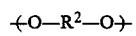 (3)

wherein $R^2$ is a group of the formula

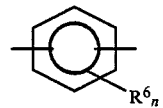

wherein $R^6$ is a $C_1$–$C_4$ alkyl group or a phenyl group and n is 0 or an integer of up to 4,

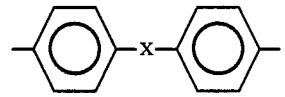

wherein X is an oxygen atom, a sulfur atom, a sulfonyl group, a carbonyl group, an alkylene group, an ester group or a direct bond,

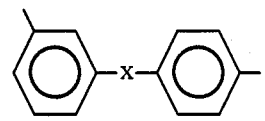

wherein X is as defined above, and/or

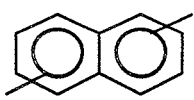

and (f) from 10 to 75 equivalent % of an aromatic oxycarboxylic acid residue of the formula:

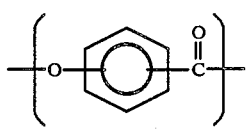
(6)

the total of the residues (a), (e), (c) and (f) being from 90 to 100 equivalent %.

8. The wholly aromatic polyester according to claim 7, which is optically anisotropic in the molten phase.

9. The wholly aromatic polyester according to claim 7, which further contains (g) from 0 to 10 equivalent % of a residue of the formula:

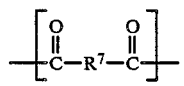
(11)

wherein $R^7$ is $R^1$ less

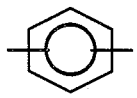

and/or

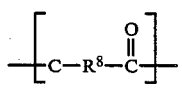
(12)

wherein $R^8$ is $R^3$ less

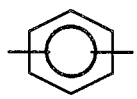

10. The wholly aromatic polyester according to claim 1, which comprises:

(a) from 2 to 45 equivalent % of a 3,3'-biphenyldicarboxylic acid residue of the formula:

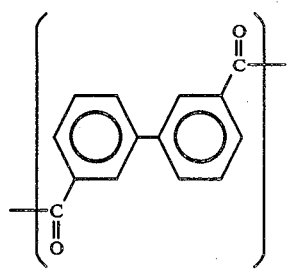
(1)

(e) from 5 to 48 equivalent % of an aromatic dicarboxylic acid residue of the formula:

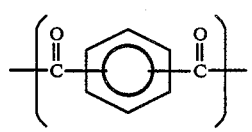
(5)

and (c) about 50 equivalent % of an aromatic dioxy compound residue of the formula:

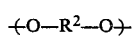
(3)

wherein $R^2$ is a group of the formula

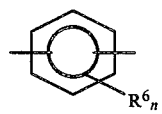

wherein $R^6$ is a $C_1$-$C_4$ alkyl group or a phenyl group and n is 0 or an integer of up to 4,

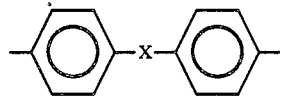

wherein X is an oxygen atom, a sulfur atom, a sulfonyl group, a carbonyl group, an alkylene group, an ester group or a direct bond,

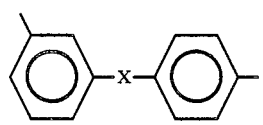

wherein X is as defined above, and/or

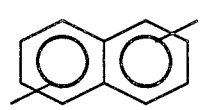

the total of the residues (a) and (e) being about the same equivalent % as the residue (c), and the total of the residues (a), (e) and (c) being from 90 to 100 equivalent %.

11. The wholly aromatic polyester according to claim 10, which is optically anisotropic in the molten phase.

12. The wholly aromatic polyester according to claim 10, which has a glass transition temperature (Tg) of at least 120° C.

13. The wholly aromatic polyester according to claim 10, which further contains (h) from 0 to 10 equivalent % of a residue of the formula:

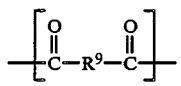
(13)

wherein $R^9$ is $R^1$ less

14. The aromatic polyester according to claim 1, which comprises:
(a) from 5 to 45 equivalent % of a 3,3′-biphenylcarboxylic acid residue of the formula:

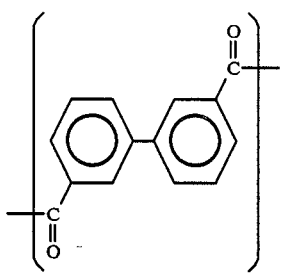
(1)

(e) from 5 to 45 equivalent % of an aromatic dicarboxylic acid residue of the formula:

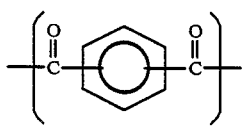
(5)

and
(c) about 50 equivalent % of an aromatic dioxy compound residue selected from the group consisting of a 2,2′-bis(4-hydroxyphenyl)propane residue, a bis(4-hydroxyphenyl)sulfone residue, a bis(4-hydroxyphenyl)ether residue and a resorcinol residue,
the total of the residues (a) and (e) being about 50 equivalent %, and the total of the residues (a), (e) and (c) being 100 equivalent %.

15. The wholly aromatic polyester according to claim 14, which has a glass transition temperature (Tg) of at least 150° C.

16. A process for producing a wholly aromatic polyester, which comprises reacting
(i) a 3,3′-biphenyldicarboxylic acid of the formula:

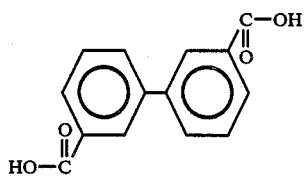
(7)

(j) an aromatic dicarboxylic acid of the formula:

(8)

wherein $R^1$ is a bivalent aromatic hydrocarbon group or a group of the formula $R^4$—X—$R^5$ wherein each of $R^4$ and $R^5$ is a bivalent aromatic hydrocarbon group and X is an oxygen atom, a sulfur atom, a sulfonyl group, a carbonyl group, an alkylene group, an ester group or a direct bond, provided that $R^1$ is not a 3,3′-biphenyl group, (k) an aromatic dihydroxy compound of the formula:

HO—$R^2$—OH (9)

wherein $R^2$ is a group of the formula

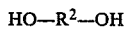

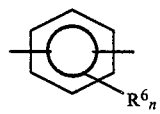

wherein $R^6$ is a $C_1$-$C_4$ alkyl group or a phenyl group and n is 0 or an integer of up to 4,

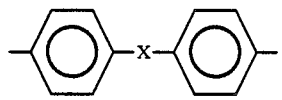

wherein X is as defined above,

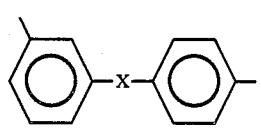

wherein X is as defined above, and/or

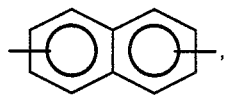

and
(l) an aromatic hydroxycarboxylic acid of the formula:

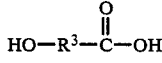
(10)

wherein $R^3$ is a bivalent aromatic hydrocarbon group or $R^4$—X—$R^5$ wherein $R^4$, $R^5$ and X are as defined above, or their derivatives in the presence of an acid anhydride, followed by reaction at a temperature of from 100° to 400° C., while distilling off the acid and acid anhydride.

17. The wholly aromatic polyester according to claim 1, wherein said component (a) is present in an amount ranging from 5 to 35 equivalent percent.

18. The wholly aromatic polyester according to claim 1, wherein said component (c) is present in an amount ranging from 20 to 50 equivalent percent.

19. The wholly aromatic polyester according to claim 1, wherein said component (d) is present in an amount ranging from 10 to 70 equivalent percent.

* * * * *